(12) United States Patent
Makino et al.

(10) Patent No.: US 12,267,471 B2
(45) Date of Patent: Apr. 1, 2025

(54) IMAGE FORMING APPARATUS HAVING A CABLE AND A REINFORCING MEMBER ALONG THE CABLE

(71) Applicant: CANON KABUSHIKI KAISHA, Tokyo (JP)

(72) Inventors: Yusaku Makino, Chiba (JP); Hirohisa Sawada, Saitama (JP); Shingo Hattori, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/528,238

(22) Filed: Dec. 4, 2023

(65) Prior Publication Data

US 2024/0106951 A1    Mar. 28, 2024

Related U.S. Application Data

(63) Continuation of application No. 17/678,845, filed on Feb. 23, 2022, now Pat. No. 11,876,938.

(30) Foreign Application Priority Data

Feb. 26, 2021    (JP) ................. 2021-030363

(51) Int. Cl.
*H04N 1/00* (2006.01)
*G03G 15/00* (2006.01)

(52) U.S. Cl.
CPC .......... *H04N 1/0083* (2013.01); *G03G 15/50* (2013.01); *H04N 1/00496* (2013.01); *H04N 1/00557* (2013.01); *H04N 1/00907* (2013.01)

(58) Field of Classification Search
None
See application file for complete search history.

(56) References Cited

U.S. PATENT DOCUMENTS

| | | | | |
|---|---|---|---|---|
| 5,982,966 | A * | 11/1999 | Bonicel | G02B 6/4403 385/100 |
| 8,659,805 | B2 * | 2/2014 | Eguchi | H02P 23/14 318/434 |
| 2008/0062444 | A1 * | 3/2008 | Sugawara | H04N 1/00496 358/1.9 |
| 2009/0059262 | A1 * | 3/2009 | Takuwa | G03G 21/206 358/1.13 |
| 2009/0073478 | A1 * | 3/2009 | Takuwa | G03G 15/80 358/1.13 |

(Continued)

*Primary Examiner* — Dov Popovici
(74) *Attorney, Agent, or Firm* — Canon U.S.A., Inc. IP Division

(57) ABSTRACT

An image forming apparatus includes an image forming unit configured to perform image formation on a sheet, a casing configured to house the image forming unit, an operation unit configured to receive an operation performed by a user, an electric wire extending from the casing to be connected to the operation unit and configured to transmit an electrical signal, a reinforcing member provided separate from and independent of the electric wire, the reinforcing member interconnecting the casing and the operation unit, and a covering configured to enclose therein the electric wire and the reinforcing member, wherein the reinforcing member is fixed to the casing and the operation unit in such a manner that a distance between a portion fixed to the casing and a portion fixed to the operation unit in the reinforcing member is shorter than a total length of the electric wire.

8 Claims, 19 Drawing Sheets

(56) References Cited

U.S. PATENT DOCUMENTS

| | | | | |
|---|---|---|---|---|
| 2012/0236340 A1* | 9/2012 | Tsuduki | ............ | H04N 1/00493 358/1.12 |
| 2016/0028907 A1* | 1/2016 | Kato | ................. | H04N 1/00477 358/1.13 |
| 2016/0085200 A1* | 3/2016 | Fujita | .................... | G03G 15/80 399/90 |
| 2018/0027134 A1* | 1/2018 | Sugawara | .......... | H04N 1/00559 358/1.12 |
| 2018/0178740 A1* | 6/2018 | Tomosada | .......... | B60R 16/0215 |

* cited by examiner

IMAGE FORMING APPARATUS HAVING A CABLE AND A REINFORCING MEMBER ALONG THE CABLE

CROSS-REFERENCE TO RELATED APPLICATIONS

The present application is a continuation of U.S. patent application Ser. No. 17/678,845, filed on Feb. 23, 2022, which claims priority from Japanese Patent Application No. 2021-030363, filed on Feb. 26, 2021, which are hereby incorporated by reference herein in their entireties.

BACKGROUND

Field

Aspects of the present disclosure generally relate to a connection configuration in which a cable for interconnecting an image forming apparatus and an operation unit has for connection to the image forming apparatus and the operation unit.

Description of the Related Art

An image forming apparatus such as a copying machine includes an operation unit via which the user operates, for example, switching of operations or detailed settings in each operation. Even in a system (image forming system) in which option devices, such as a paper feed unit, a conveyance unit, and a post-processing unit, are also connected to the image forming apparatus, the user uses the operation unit to perform setting work for such various operation devices.

Furthermore, in the case of a large-size image forming system the total length of which is long due to a plurality of option devices being connected to the image forming apparatus as mentioned above, the user may perform working on an option device at a place away from the image forming apparatus, on which an operation unit is provided. The user may feel it troublesome to come and go between the option device and the operation unit each time the user operates the option device and the operation unit.

Therefore, there is proposed, for example, an image forming system in which an operation unit is able to be mounted on not only an image forming apparatus but also an option device, as discussed in Japanese Patent Application Laid-Open No. 2010-243977. The operation unit described in Japanese Patent Application Laid-Open No. 2010-243977 includes a display for displaying information to the user, an arm for supporting the display, and a supporting base for supporting the display via the arm. The display, which is supported by the arm extending from the supporting base, is at a predetermined angle to a placement surface on which the supporting base is placed.

The above-mentioned operation unit is connected to the image forming apparatus with a cable, so that the operation unit is able to be mounted at an optional place above the top surface of the image forming apparatus within a range allowed by the length of the cable.

However, inside a cable which interconnects the casing of the image forming apparatus and the operation unit, an electric wire for transmitting an electrical signal from the image forming apparatus to the operation unit is provided. When the user moves the operation unit, if the cable is excessively pulled, the electric wire located inside the cable may be disconnected or broken.

SUMMARY OF THE DISCLOSURE

According to an aspect of the present disclosure, an image forming apparatus includes an image forming unit configured to perform image formation on a sheet, a casing configured to house the image forming unit, an operation unit configured to receive an operation performed by a user, an electric wire extending from the casing to be connected to the operation unit and configured to transmit an electrical signal, a reinforcing member provided separate from and independent of the electric wire, the reinforcing member interconnecting the casing and the operation unit, and a covering configured to enclose therein the electric wire and the reinforcing member, wherein the reinforcing member is fixed to the casing and the operation unit in such a manner that a distance between a portion fixed to the casing and a portion fixed to the operation unit in the reinforcing member is shorter than a total length of the electric wire.

According to another aspect of the present disclosure, an image forming apparatus includes an image forming unit configured to perform image formation on a sheet, a casing configured to house the image forming unit, an operation unit configured to receive an operation performed by a user and transmit an execution signal for causing the image forming unit to perform image formation, an electric wire extending from the casing to be connected to the operation unit and configured to transmit an electrical signal, a reinforcing member provided separate from and independent of the electric wire, the reinforcing member interconnecting the casing and the operation unit, and a covering configured to enclose therein the electric wire and the reinforcing member, wherein the electric wire and the reinforcing member are fixed to the casing and the operation unit in such a manner that, in a state in which there is no deflection between a portion fixed to the casing and a portion fixed to the operation unit in the reinforcing member, the electric wire deflects.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings. Furthermore, for example, the dimension, material, shape, and relative location of each constituent component described in the following description are not intended to limit the scope of the present disclosure to only them unless otherwise specified in the following description. Hereinafter, in the description of exemplary embodiments, as illustrated in FIG. 1, as viewed toward an image forming apparatus 2, a direction leading toward the near side is defined as a front direction F, a direction leading toward the far side (back side) is defined as a back direction B, a direction leading toward the left side is defined as a leftward direction L, a direction leading toward the right side is defined as a rightward direction R, a direction leading toward the upper side is defined as an upward direction U, and a direction leading toward the lower side is defined as a downward direction D.

<Configuration of Image Forming System>

Figure 1:
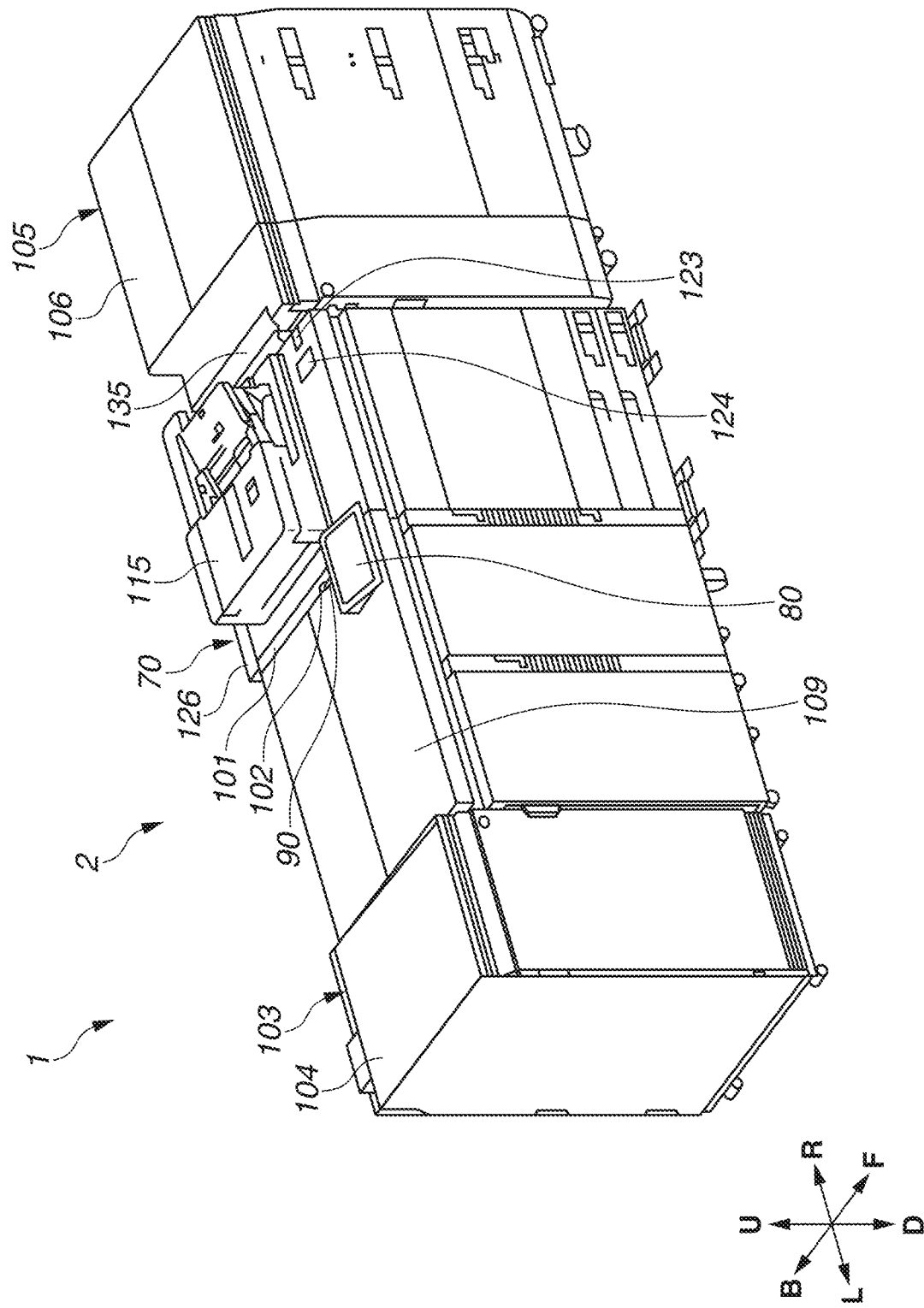
FIG. 1 is a schematic sectional view of an image forming system.

As illustrated in FIG. 1, an image forming system 1 according to an exemplary embodiment includes an image forming apparatus 2, which is, for example, a printer, and a post-processing apparatus 103, which is located adjacent to the image forming apparatus 2 on the leftward direction L side thereof and is able to stack therein sheets S subjected to image formation. Furthermore, in the present exemplary embodiment, for example, the image forming apparatus 2 or the post-processing apparatus 103 is defined as a casing. A top surface 109, which is usable as a work space, is provided at the upper surface of the image forming apparatus 2. In the present exemplary embodiment, the size of the top surface 109 is larger than the maximum size of a sheet S on which the image forming apparatus 2 is able to perform image formation. The user can perform work, such as technical drawing with a drawing sheet spread, on the top surface 109. Accordingly, assuming that the floor on which the image forming system 1 is installed is horizontal, the top surface 109 is configured to be also horizontal.

Additionally, the top surface 109 is configured to be as flat as possible. Here, a region denoted by reference numeral 1010 in FIG. 4 described below is an example of a work space. If the image forming system 1 is installed in a horizontal fashion, the work space 1010 is also horizontal. Moreover, this region is a part of the top surface 109 and is, therefore, flat. The term "flat surface" means a surface designed in such a way as to rid any unevenness, such as a groove, excepting, for example, a connection place between members which inevitably occurs due to designing of an exterior of the image forming system 1. The work space 1010 only needs to have a region enough to spread an A3 size sheet at a minimum, and a flat surface only needs to be ensured in this region. Furthermore, the top surface 109 is configured with, for example, a plate made from plastic, and is assumed to be regarded as a "flat surface" even if there is a backlash or undulation to the degree that it inevitably occurs in manufacturing. Moreover, the term "horizontal" as used herein does not mean horizontal in a mathematically strict sense but has a sense including horizontal to the degree that it is able to be deemed to be practically horizontal, i.e., approximately horizontal.

In the present exemplary embodiment, a tandem type full-color printer is described as an example of the image forming apparatus 2. However, the present exemplary embodiment is not limited to the tandem type image forming apparatus 2, but can be any other type image forming apparatus, and, moreover, the present exemplary embodiment is not limited to the full-color image forming apparatus 2, but can be a monochrome or mono-color image forming apparatus.

Figure 2:
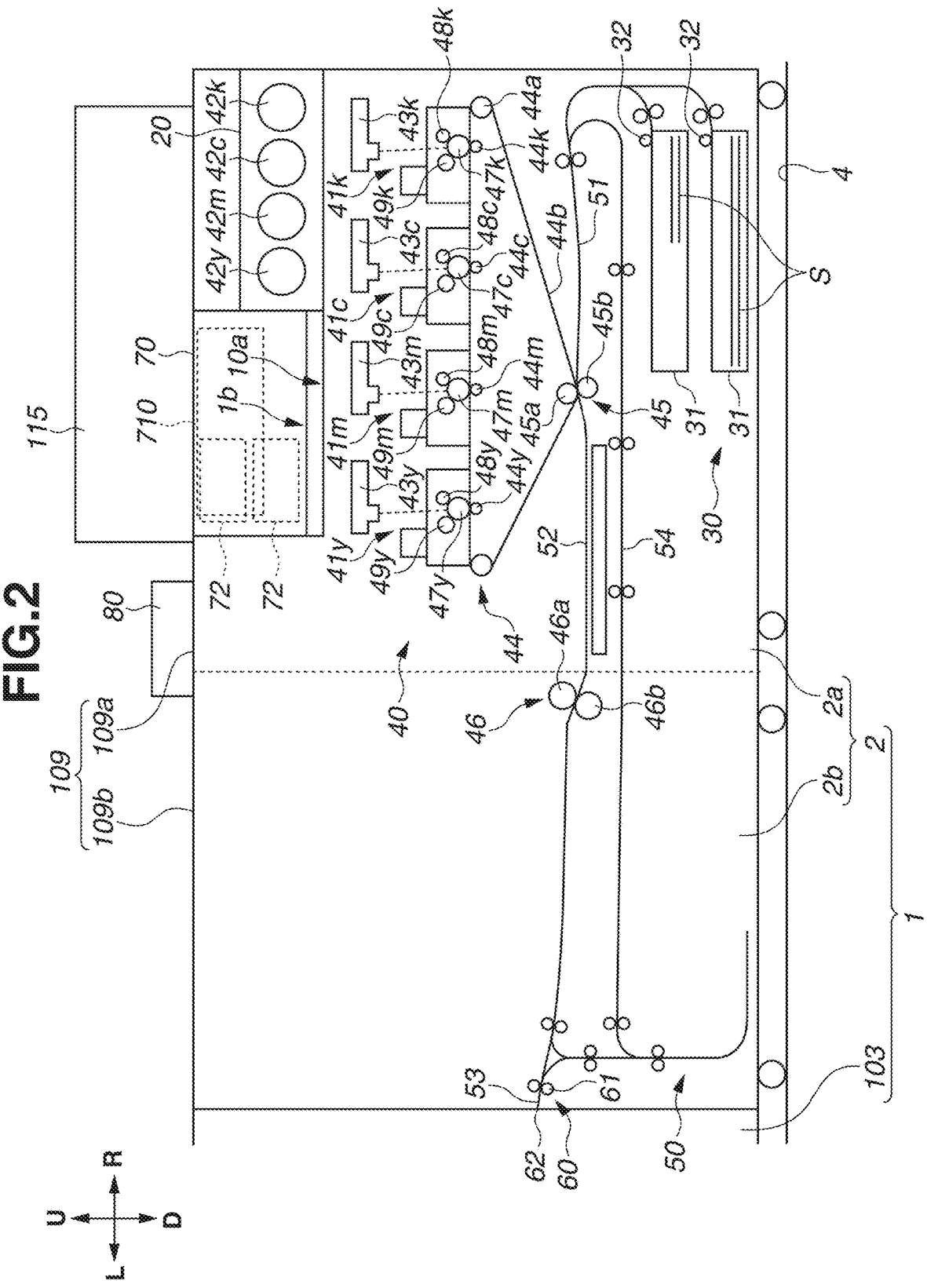
FIG. 2 is a schematic sectional view of a part of the image forming system.

As illustrated in FIG. 2, in the present exemplary embodiment, the image forming apparatus 2, which is an example of a casing, is dividable into two sections, i.e., an image forming section casing 2a and a conveyance section casing 2b. The conveyance section casing 2b conveys a sheet subjected to image formation in the image forming section casing 2a toward a post-processing apparatus 103 (not illustrated in FIG. 2). Each of the image forming section casing 2a and the conveyance section casing 2b is an example of a casing. Moreover, the image forming section casing 2a and the conveyance section casing 2b can be collectively referred to as a "casing". The image forming section casing 2a includes a top surface 109a, and the conveyance section casing 2b includes a top surface 109b. The image forming section casing 2a and the conveyance section casing 2b are connectable to each other, so that the top surface 109a and the top surface 109b are also connected to each other to configure a single flat top surface 109. In this way, since the image forming section casing 2a and the conveyance section casing 2b are connectable to and detachable from each other, for example, in the case of transportation to, for example, an upper floor of the building, the image forming section casing 2a and the conveyance section casing 2b are able to be put on the elevator while being detached from each other, thus being transported to a given floor. This enables easily transporting even a large-size image forming system 1 long in overall length to a given floor in the building with use of, for example, an elevator.

The image forming apparatus 2 includes a toner supply unit 20, a sheet feeding section 30, an image forming section (an example of an image forming unit) 40, a sheet conveyance section 50, a sheet discharge section 60, an electrical component unit 70, and an operation unit 80. Furthermore, a sheet S, which is a recording material on which to form a toner image, and specific examples of the sheet S include plain paper and a sheet made from synthetic resin, thick paper, and a sheet for overhead projector, each serving as a substitute for plain paper. In the present exemplary embodiment, the image forming section 40 is contained inside the image forming section casing 2a.

The sheet feeding section 30 is located at a lower portion of the image forming apparatus 2, includes a sheet cassette 31, which is configured to stack thereon and stores therein sheets S, and a feeding roller 32, and is configured to feed a sheet S to the image forming section 40.

The image forming section 40 includes image forming units 41, toner bottles 42, exposure devices 43, an intermediate transfer unit 44, a secondary transfer section 45, and a fixing device 46, and is configured to perform image formation.

The image forming units 41 include four image forming units 41y, 41m, 41c, and 41k, which are configured to form respective toner images of four colors, i.e., yellow (y), magenta (m), cyan (c), and black (k). These image forming units are configured to be attachable to and detachable from the image forming apparatus 2 by the user. For example, the image forming unit 41y includes, for example, a photosensitive drum 47y for forming a toner image, a charging roller 48y, a developing sleeve 49y, a drum cleaning blade (not illustrated), and toner. Moreover, the image forming unit 41y receives toner supplied from the toner bottle 42y, in which toner is contained. Moreover, each of the other image forming units 41m, 41c, and 41k has a configuration similar to that of the image forming unit 41y except that there is a difference in toner color, and, therefore, the detailed description thereof is omitted.

The exposure device 43y serves as an exposure unit configured to expose the surface of the photosensitive drum 47y to light, thus forming an electrostatic latent image on the surface of the photosensitive drum 47y.

The intermediate transfer unit 44 is located below the image forming units 41 in the downward direction D. The intermediate transfer unit 44 includes a plurality of rollers, such as a drive roller 44a and primary transfer rollers 44y, 44m, 44c, and 44k, and an intermediate transfer belt 44b, which is suspended between these rollers in a tensioned manner. The primary transfer rollers 44y, 44m, 44c, and 44k are located opposite to the photosensitive drums 47y, 47m, 47C, and 47k, respectively, and is configured to be in abutting contact with the intermediate transfer belt 44b. Applying a transfer bias of positive polarity to the intermediate transfer belt 44b via the primary transfer rollers 44y, 44m, 44c, and 44k causes toner images of negative polarity formed on the photosensitive drums 47y, 47m, 47C, and 47k to be sequentially transferred to the intermediate transfer belt 44b in a multiplexed manner. This results in a full-color image being formed on the intermediate transfer belt 44b.

The secondary transfer section 45 includes a secondary transfer inner roller 45a and a secondary transfer outer roller 45b. Applying a secondary transfer bias of positive polarity to the secondary transfer outer roller 45b causes the full-color image formed on the intermediate transfer belt 44b to be transferred to a sheet S.

Furthermore, the secondary transfer inner roller 45a suspends the intermediate transfer belt 44b in a tensioned manner at the inner side of the intermediate transfer belt 44b, and the secondary transfer outer roller 45b is located at a position facing the secondary transfer inner roller 45a across the intermediate transfer belt 44b.

The fixing device 46 includes a fixing roller 46a and a pressure roller 46b. The sheet S being conveyed while being pinched between the fixing roller 46a and the pressure roller 46b causes the toner image transferred to the sheet S to be pressed and heated to be fixed to the sheet S. Furthermore, while, in the present exemplary embodiment, the conveyance section casing 2b includes the fixing device 46, the present exemplary embodiment is not limited to this. For example, a configuration in which the image forming section casing 2a includes the fixing device 46 and the conveyance section casing 2b does not include the fixing device 46 can be employed. Naturally, each of the image forming section casing 2a and the conveyance section casing 2b can include a fixing device.

The sheet conveyance section 50 is configured to convey the sheet S, which has been fed from the sheet feeding section 30, from the image forming section 40 to the sheet discharge section 60, and includes a pre-secondary transfer conveyance path 51, a pre-fixing conveyance path 52, a discharge path 53, and a re-conveyance path 54.

The sheet discharge section 60 includes a discharge roller pair 61, which is located at the downstream side of the discharge path 53, and a discharge opening 62, which is arranged at a side portion in the leftward direction L of the image forming apparatus 2. The discharge roller pair 61 is configured to feed the sheet S, which has been conveyed from the discharge path 53, from a nip portion thereof and then discharge the sheet S from the discharge opening 62. The discharge opening 62 is configured to be able to feed the sheet S to the post-processing apparatus 103, which is located at the side in the leftward direction L of the image forming apparatus 2.

Figure 3:
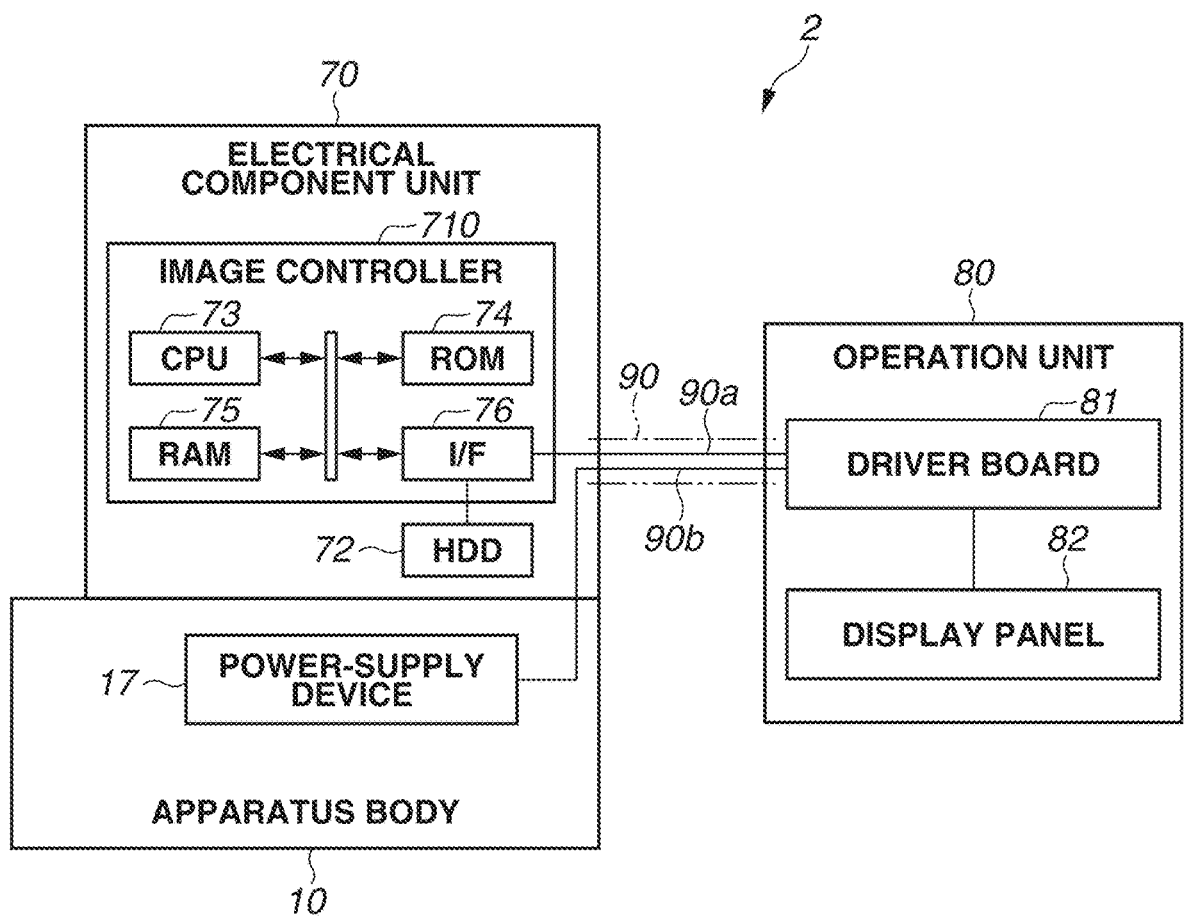
FIG. 3 is a diagram used to explain a control configuration for an operation unit in the image forming system.

As illustrated in FIG. 3, the electrical component unit 70 includes, as built-in components, an image controller 710, which is a control board including a control unit, and a hard disk drive (HDD) 72, which is a removable large-capacity storage device. The image controller 710 is configured with a computer, and includes, for example, a central processing unit (CPU) 73, a read-only memory (ROM) 74, which stores programs for controlling respective components, a random access memory (RAM) 75, which temporarily stores data, and an input-output circuit (interface (I/F)) 76. The HDD 72, which is a removable large-capacity storage device for storing electronic data, is able to accumulate mainly an image processing program, digital image data, and ancillary information about digital image data. At the time of image formation, image data is read out from the HDD 72.

The CPU 73 is a microprocessor which comprehensively controls the image forming apparatus 2, and serves as a system controller. The CPU 73 is connected to the sheet feeding section 30, the image forming section 40, the sheet conveyance section 50, the sheet discharge section 60, the HDD 72, and the operation unit 80 via the input-output circuit 76 and is configured to perform exchange of signals with respective components and control operations thereof. Moreover, the image controller 710 allows the user to perform operations or settings by, for example, issuing a command from a computer (not illustrated) connected to the image forming apparatus 2 or operating the operation unit 80.

The operation unit 80 is provided as a member provided separate from the image forming apparatus 2 and is configured to be usable to operate respective components of the image forming apparatus 2. In this way, the operation unit 80 is a unit able to receive an operation performed by the user. The operation unit 80 includes a driver board 81 and a display panel (display section) 82. The display panel 82 is configured to display information required for the user to operate the image forming apparatus 2, such as the remaining quantity of sheets S and the remaining amount of toner currently stored in the image forming apparatus 2, a warning message which is issued when these consumables have run out, and displaying of a procedure for supplying a consumable. Moreover, the display panel 82 is configured to receive inputting of an operation performed by the user, such as settings of the size or grammage of a sheet S, density adjustment of an image, and the number of sheets to be output.

The operation unit 80 is connected to the electrical component unit 70 of the image forming apparatus 2 via a cable 90 and is configured to be supplied with electric power. While the cable 90 is formed as a bundle wire in which a signal wire 90a and a power wire (an example of an electric power wire) 90b are bundled, the signal wire 90a and the power wire 90b can be respective different cables. The signal wire 90a interconnects the input-output circuit 76 of the image controller 710 and the driver board 81, and the power wire 90b interconnects a power-supply device 17 of the image forming apparatus 2 and the driver board 81. Furthermore, each of the signal wire 90a and the power wire 90b is an example of an electric wire for transmitting an electrical signal. Although details are described below, the term "electrical signal" as used herein also includes a signal serving as a trigger used for the CPU 73 to cause the image forming section 40 to perform image formation (an execution signal) and electric power used for driving the operation unit 80 (electric current flowing).

Next, an image forming operation of the image forming apparatus 2 configured as described above is described.

When the image forming operation is started, first, the photosensitive drums 47y, 47m, 47c, and 47k rotate and the respective surfaces thereof are electrically charged by the developing rollers 48y, 48m, 48c, and 48k. Then, laser beams are emitted by the exposure devices 43y, 43m, 43c, and 43k to the photosensitive drums 47y, 47m, 47c, and 47k, respectively, based on image information, so that electrostatic latent images are formed on the respective surfaces of the photosensitive drums 47y, 47m, 47c, and 47k. The electrostatic latent images are developed with toner adhering thereto and are thus made visible as toner images, and the toner images are then transferred to the intermediate transfer belt 44b.

On the other hand, in parallel with such a forming operation for toner images, the feeding roller 32 rotates to feed the uppermost sheet S in the sheet cassette 31 while separating the uppermost sheet S from the remaining ones. Then, in conformity with timing of the toner images on the intermediate transfer belt 44b, the sheet S is conveyed to the secondary transfer section 45 via the pre-secondary transfer conveyance path 51. Additionally, the toner images are transferred from the intermediate transfer belt 44b to the sheet S, the sheet S are then conveyed to the fixing device 46, the unfixed toner images are heated and pressed at the fixing device 46 to be fixed to the surface of the sheet S, and the sheet S is then discharged from the discharge opening 62 by the discharge roller pair 61 to be supplied to the post-processing apparatus 103.

<Configuration of Operation Unit>

First, the outlines of the electrical component unit 70, the operation unit 80, the cable 90, a cover 101, and an opening portion 102 are described.

The electrical component unit 70 is provided at the back surface of the image forming apparatus 2. A connector (not illustrated) provided at one end of the cable 90 is connected to the electrical component unit 70. The cable 90 is used to transmit a control signal for controlling the operation unit 80 from the electrical component unit 70 to the operation unit 80. The cable 90 functions to interconnect the image forming apparatus 2 and the operation unit 80 in such a way as to enable them to communicate with each other.

A connector (not illustrated) provided at the other end of the cable 90 is connected to the operation unit 80. In this way, although being connected to the image forming apparatus 2 via a cable, the operation unit 80 is not fixed to the top surface 109. Therefore, the user is allowed to freely arrange the operation unit 80 at an optional position on the top surface 109. In this way, the term "freely" as used herein denotes a state in which the operation unit 80 is not fixed to the top surface 109 via, for example, a vis screw, i.e., a configuration in which the arrangement position of the operation unit 80 is able to be freely changed on the top surface 109.

Furthermore, in the present exemplary embodiment, the image forming apparatus 2 and the operation unit 80 perform bidirectional communication with each other via the cable 90. Therefore, as mentioned above, the user is able to freely change the arrangement position of the operation unit 80 within the range of the cable length of the cable 90. Moreover, there can be considered another exemplary embodiment in which a wireless communication method is used. In this case, the range within which the operation unit 80 is able to be moved is not limited by a cable.

Accordingly, the user is able to move the operation unit 80 beyond the range of the length of the cable 90. Even in this case, since the arrangement position of the operation unit 80 is able to be freely changed on the top surface 109, the user is able to freely arrange the operation unit 80 on the top surface 109.

Figure 4:
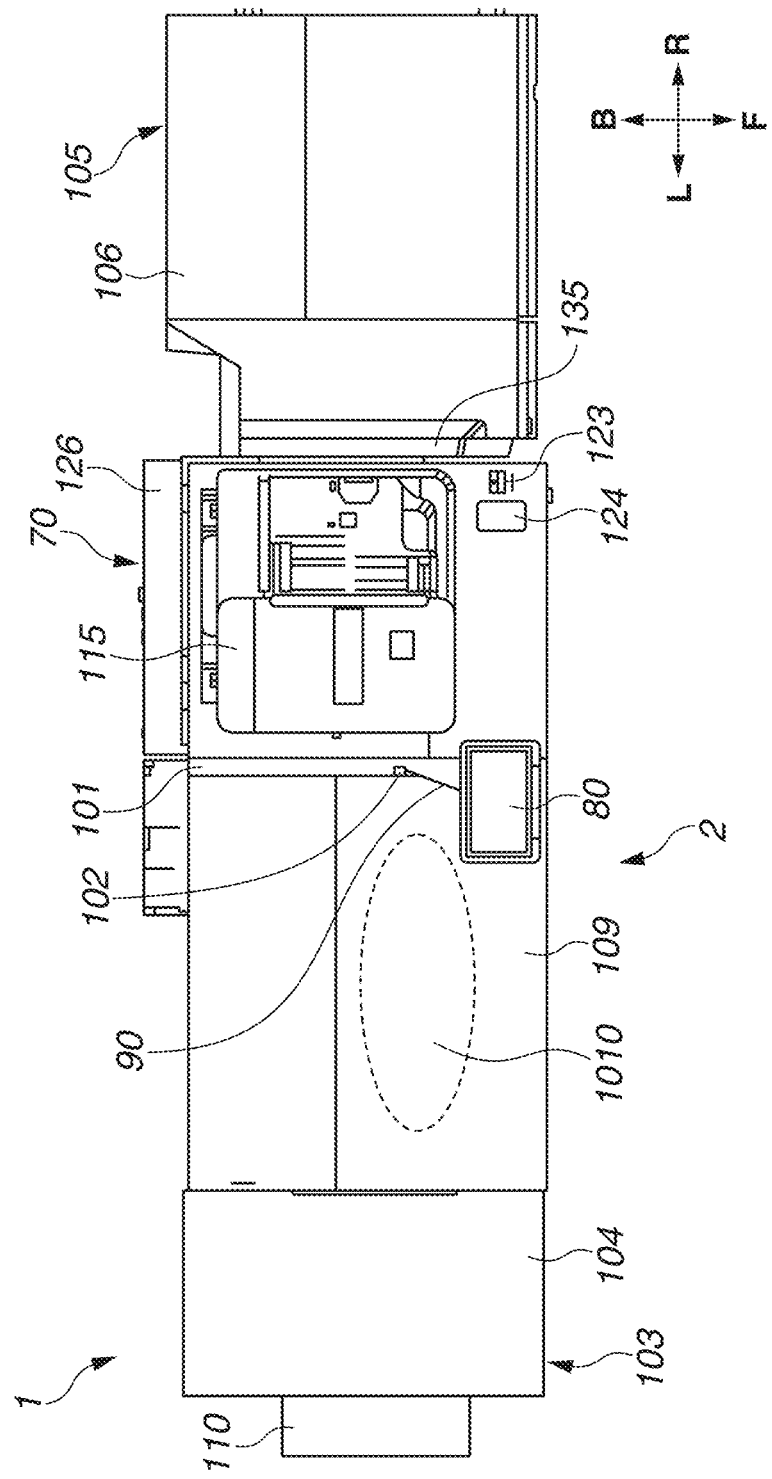
FIG. 4 is a diagram illustrating an arrangement in which the operation unit is located to the left side of a reading device on the top surface of a casing.
Figure 5:
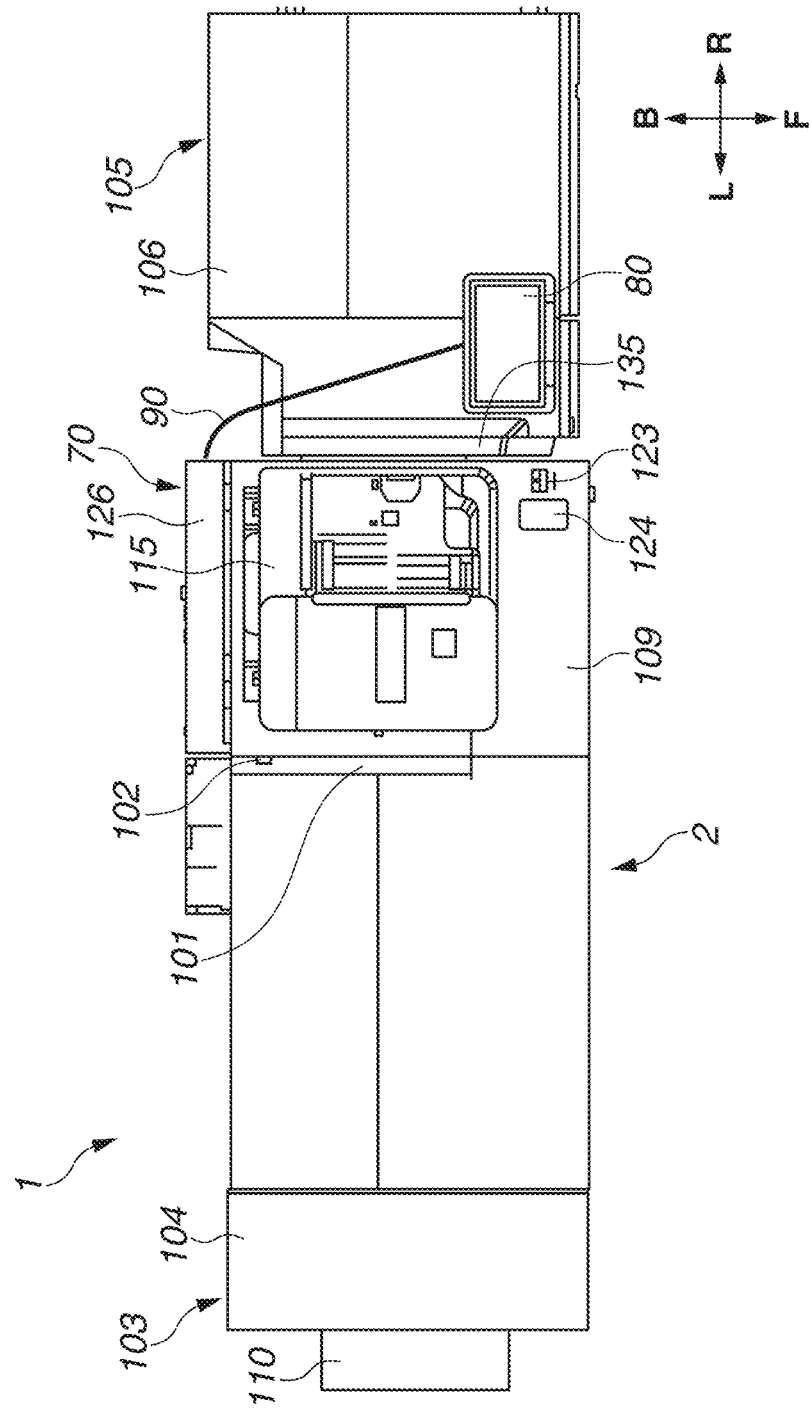
FIG. 5 is a diagram illustrating an arrangement in which the operation unit is located to the right side of the reading device on the top surface of the casing.

FIG. 4 and FIG. 5 are diagrams used to explain positions at which the operation unit 80 is able to be arranged on the top surface 109. For example, as illustrated FIG. 4, the operation unit 80 is able to be arranged at a space close to a document reading device 115 on the top surface 109 of the image forming apparatus 2, and, moreover, as illustrated in FIG. 5, the operation unit 80 is able to be arranged at a space on a top surface 106 of a sheet feeding device 105. The operation unit 80 is also able to be arranged at any top surface of the image forming system 1 which is not illustrated in any one of FIG. 4 and FIG. 5, such as a top surface 104 of the post-processing apparatus 103. Moreover, the operation unit 80 is also able to be arranged at any space other than the top surface of the image forming system 1, such as on a working table (not illustrated) installed near the image forming system 1.

Figure 6A:
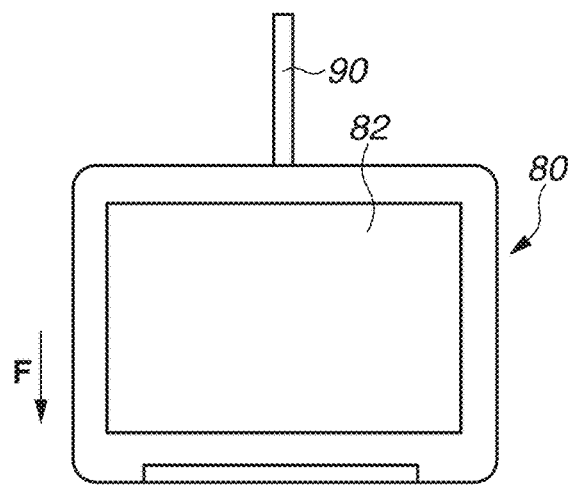
FIGS. 6A, 6B, and 6C are diagrams used to explain the operation unit.
Figure 6B:
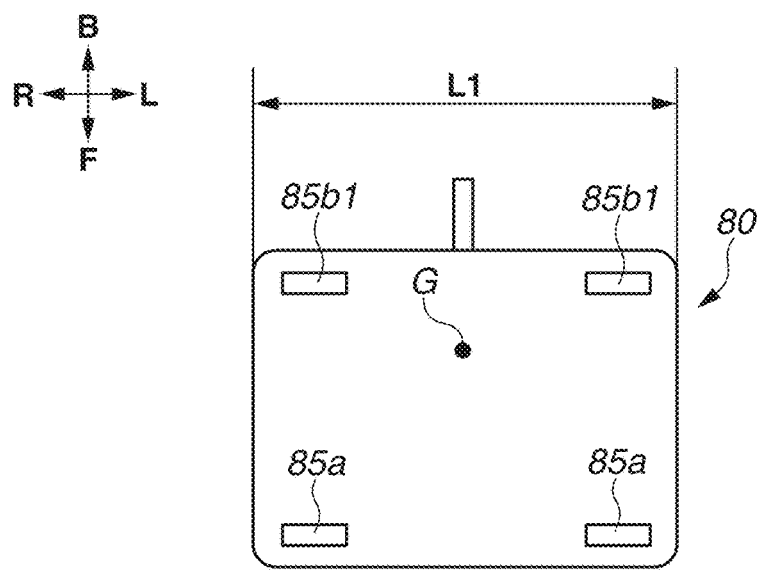
Figure 6C:
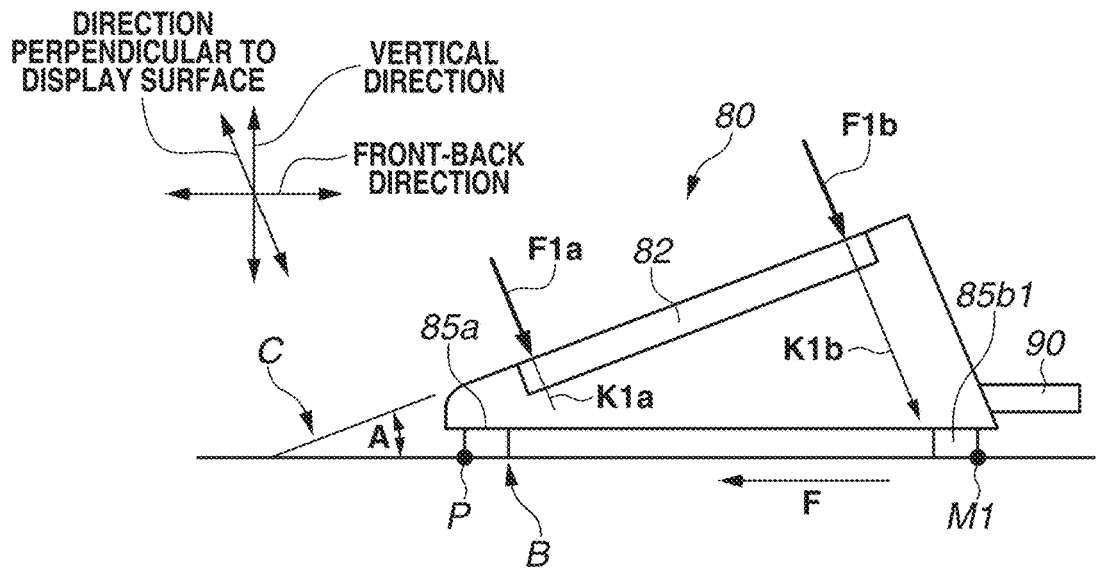

FIG. 6A is a diagram illustrating the operation unit 80 as viewed from above along the vertical direction, FIG. 6B is a diagram illustrating a bottom surface of the operation unit 80, and FIG. 6C is a side view of the operation unit 80.

As illustrated in FIG. 6A, the operation unit 80 includes a display panel 82. The display panel 82 of the operation unit 80 in the present exemplary embodiment is a liquid crustal touch panel. Thus, the display panel 82 is able to receive a touch operation performed by the user. The touch operation is an operation for touching the display panel 82 with the tip of a finger and is an operation collectively referring to movements such as a flick or scroll. The cable 90 extends from the back of the operation unit 80. Moreover, as illustrated in FIG. 6B, rubber legs 85 (85a and 85b1), which are an example of an elastic member, are provided at the bottom surface of the operation unit 80. These rubber legs 85 are also examples of a first contact portion to a fourth contact portion and are portions which come into contact with the top surface 109. The rubber legs 85 are portions which come into contact with the top surface 109 when the operation unit 80 is arranged on the top surface 109. Each rubber leg 85 is configured with an elastic member which is high in the friction coefficient of the surface thereof. Moreover, each rubber leg 85 is configured to slightly deflect when the operation unit 80 is arranged on the top surface 109. Therefore, the operation unit 80 is able to be supported at four points as in the present exemplary embodiment. While, in a plane-wave mathematical sense, the operation unit 80 is supported at three points for one position, any one of the rubber legs 85 deflecting causes all of the four points to come into contact with the top surface 109. In the operation unit 80 in the present exemplary embodiment, two near-side rubber legs 85a and two far-side rubber legs 85b1 are provided. This reduces a possibility that, when the user presses any portion of the display panel 82, the operation unit 80 may become wobbling.

Moreover, as illustrated in FIG. 6B, the four rubber legs 85 are arranged in such a way as to surround the center of gravity G of the operation unit 80. In other words, the center of gravity G is located in a region surrounded by the four rubber legs 85. With this arrangement, the operation unit 80 is stably supported by the four rubber legs 85. Thus, an operability for the user is improved. When the operation unit 80 is viewed from above along the vertical direction, with respect to a direction which is perpendicular to both a direction (a front-back side direction of the drawing sheet) perpendicular to both a perpendicular direction perpendicular to a display surface 820 described below and the vertical direction and a direction perpendicular to the display surface 820 and which is a direction to ascend a slant of the display panel 82, the rubber legs 85a are located upstream of the center of gravity G and the rubber legs 85b1 are located downstream of the center of gravity G.

Additionally, one of the two rubber legs 85b1 is provided at the right-side end portion of the operation unit 80 and the other is provided at the left-side end portion thereof. Furthermore, here, since it is assumed that the operation unit 80 placed on the top surface 109 is viewed from the side of the bottom surface of the operation unit 80, the left side of the drawing sheet is defined as the right side of the operation unit 80 and the right side of the drawing sheet is defined as the left side of the operation unit 80. Assuming that the width in the right-left direction of the operation unit 80 is L1, it is favorable that one rubber leg 85b1 is located in the rightmost (one end side) region out of regions obtained by dividing the width L1 into quarters and the other rubber leg 85b1 is located in the leftmost (the other end side) region out of regions obtained by dividing the width L1 into quarters. In this way, arranging two rubber legs 85b1 separately with an interval enables improving the stability of the operation unit 80 in a case where the operation unit 80 is arranged on the top surface 109.

Furthermore, the right-left direction as used herein means a direction perpendicular to both a perpendicular direction perpendicular the display surface 820 described below and the vertical direction and is the width direction of the operation unit 80.

FIG. 6C is a diagram illustrating the operation unit 80 arranged on the top surface 109 as viewed from the right side of the operation unit 80. Here, a surface in which the rubber leg 85 is able to follow the top surface 109 when the operation unit 80 is placed on the top surface 109 is assumed to be referred to as a "rubber leg surface", and is illustrated as a surface B in FIG. 6C. As mentioned above, in a case where the rubber legs 85 are rigid bodies, when the operation unit 80 comes into contact with the top surface 109 at four places, one place of them may float. This is inevitable due to component tolerance. Therefore, at least two of the four rubber legs 85 are made as an elastic body, so that all of the four rubber legs 85 are arranged to follow the top surface 109. This enables the user to stably operate the operation unit 80 on the top surface 109.

Here, an advantage resulting from the cable 90 extending from the back of the operation unit 80 is described with reference to FIG. 6C. As illustrated in FIG. 6C, when the operation unit 80 is viewed along the vertical direction, the cable 90 extends from the operation unit 80 toward a direction to ascend the display panel 82. This "extending direction" coincides with a direction which is perpendicular to both a direction (a front-back side direction of the drawing sheet) perpendicular to both a perpendicular direction perpendicular to the display surface 820 described below and the vertical direction and a direction perpendicular to the display surface 820, when the operation unit 80 is viewed along the vertical direction.

In this way, since the cable 90 extends from the far side of the operation unit 80 toward the rear, a connection portion between the cable 90 and the operation unit 80 is not viewable by the user operating the operation unit 80. This enables improving a design property of the operation unit 80.

Figure 7A:
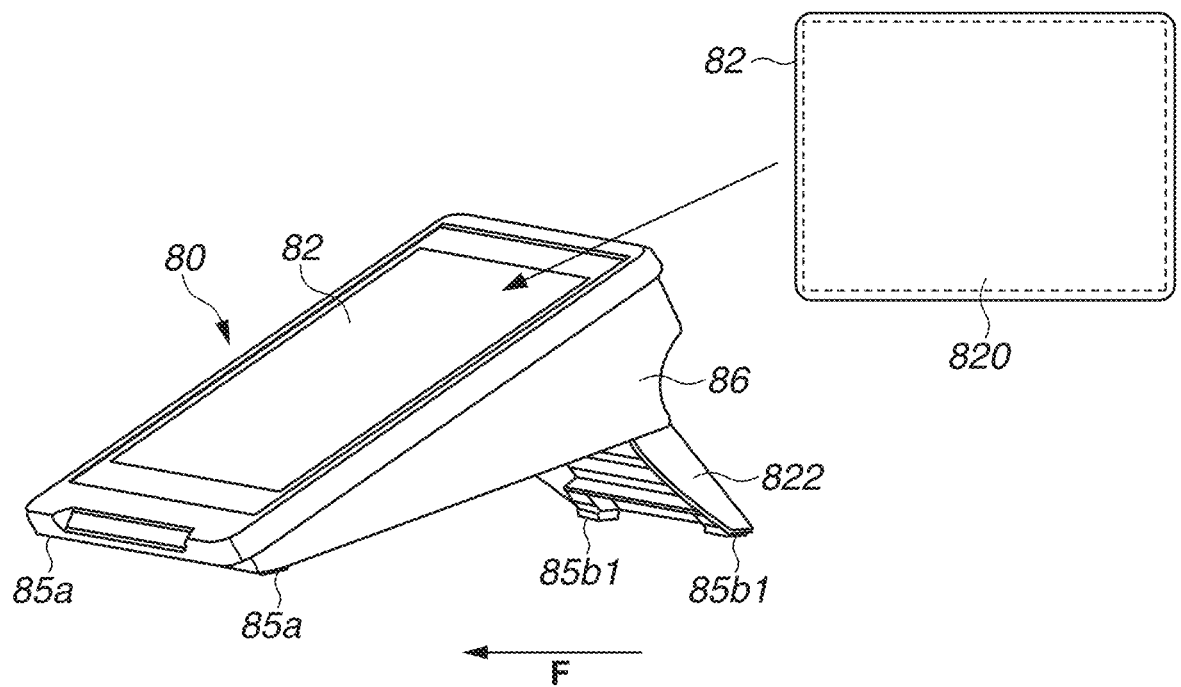
FIGS. 7A and 7B are schematic perspective views of the operation unit.
Figure 7B:
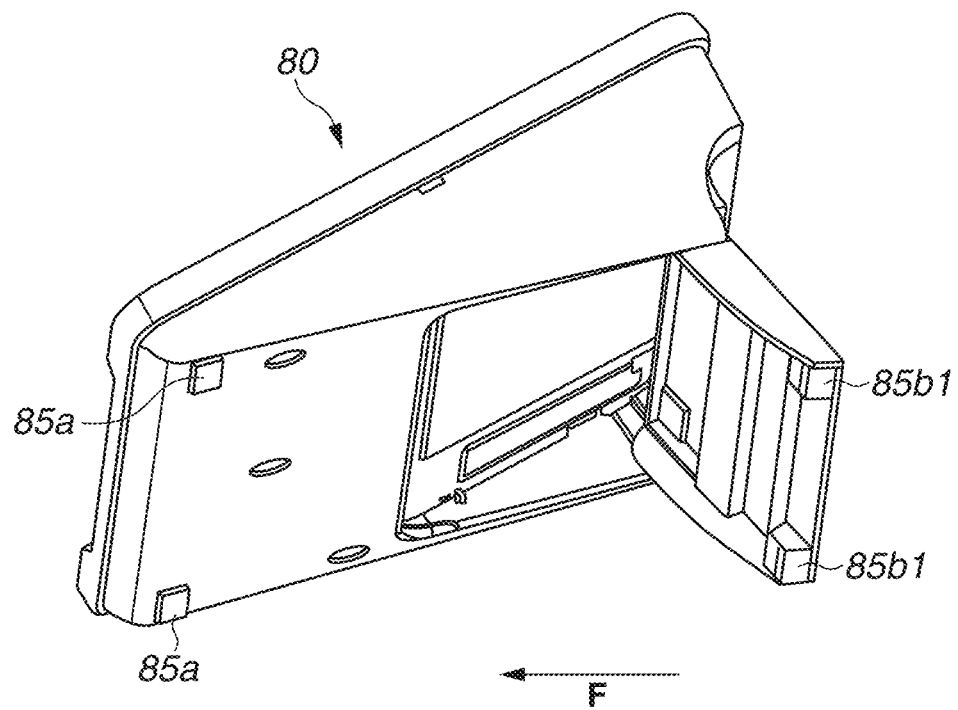

FIGS. 7A and 7B are perspective views of the operation unit 80 with an enlarged view of the display panel 82. As illustrated in FIGS. 7A and 7B, the operation unit 80 includes a supporting stand 86. The supporting stand 86 supports the display panel 82. More specifically, in a case where the operation unit 80 is arranged on the top surface 109, the supporting stand 86 supports the display panel 82 with respect to the top surface 109 in such a manner that the display panel 82 is at a predetermined angle to the top surface 109.

Moreover, the supporting stand 86 includes rubber legs 85 (85a and 85b1). More specifically, the rubber legs 85a are provided at the right end and the left end on the near side of the supporting stand 86, and an arm 822 is provided on the far side of the supporting stand 86. Then, the rubber legs 85b1 are also provided at the right end and the left end of the arm 822. When these four rubber legs 85 are in a state of being in contact with the top surface 109, the angle of the display panel 82 to the top surface 109 is determined as a predetermined angle.

The display panel 82 includes a display surface 820 able to be used to display information concerning image formation, such as a button for starting copy, a setting screen for paper size, a setting screen for the number of sheets for printing, and a display screen for the remaining amount of toner. While, in the present exemplary embodiment, the display surface 820 is provided at a portion excluding an end portion of the display panel 82, the whole surface of the display panel 82 can be configured to display information concerning image formation or screens for print settings. However, in any of these cases, the inclination angle of the display surface 820 to the top surface 109 means the angle of a portion near the center of the display panel 82 (a region corresponding to the display surface 820 in FIG. 7A) to the top surface 109.

Figure 8A:
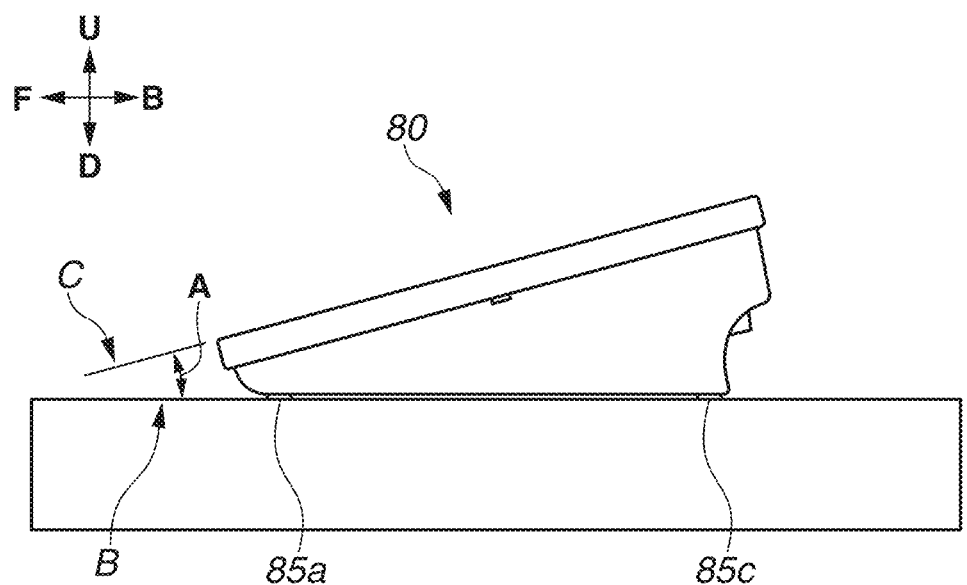
FIGS. 8A and 8B are diagrams used to explain an adjustment mechanism for an inclination angle of a display panel relative to the top surface.
Figure 8B:
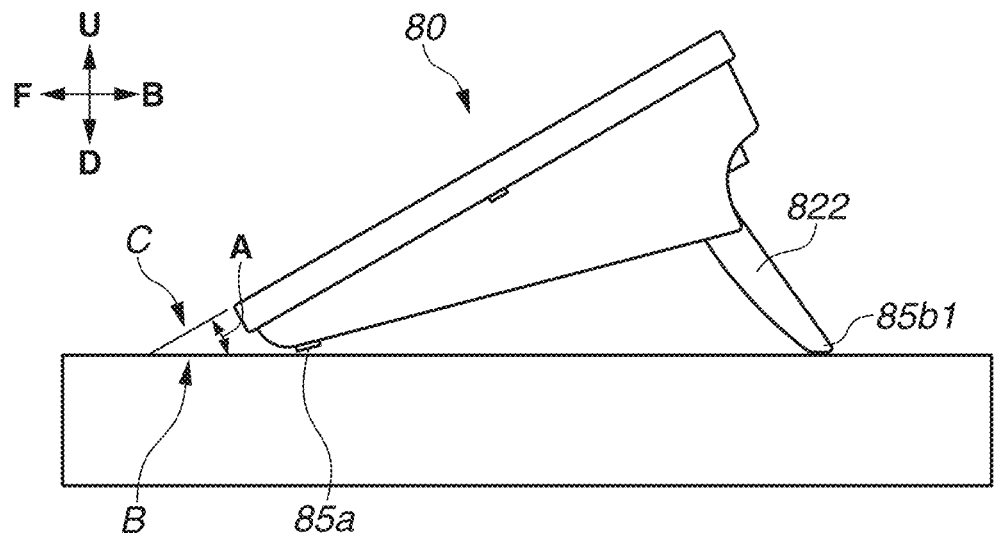

FIGS. 8A and 8B are diagrams used to explain the function of the arm 822 provided in the operation unit 80. FIG. 8A illustrates a state in which the arm 822 is housed in the back side of the operation unit 80.

Moreover, FIG. 8B illustrates the operation unit 80 with the arm 822 raised.

As illustrated in FIGS. 8A and 8B, the arm 822, which is able to turn with respect to the operation unit 80, is provided on the back side of the operation unit 80. Housing the arm 822 in the back side of the operation unit 80 (FIG. 8A) or raising the arm 822 (FIG. 8B) enables adjusting the angle of the display panel 82 to the top surface 109. In the present exemplary embodiment, this angle is 30 degrees when the arm 822 is in a state of being housed in the back side of the operation unit 80. Moreover, this angle is 45 degrees when the arm 822 is in a state of being raised. In this way, since it is possible to adjust the angle of the display panel 82 to the top surface 109, there is an advantageous effect in that the operation unit 80 is easily usable by various users differing in eye level, such as a user in a wheelchair and a tall user.

<Cable>

Figure 9A:
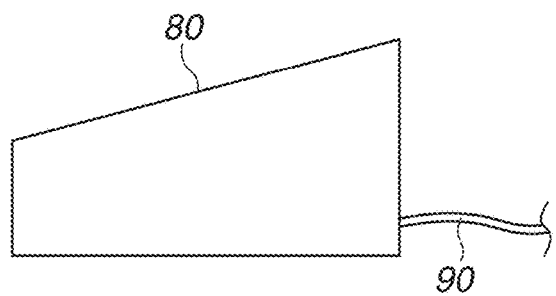
FIGS. 9A and 9B are diagrams used to explain a lead-out portion of the cable led out from the operation unit.
Figure 9B:
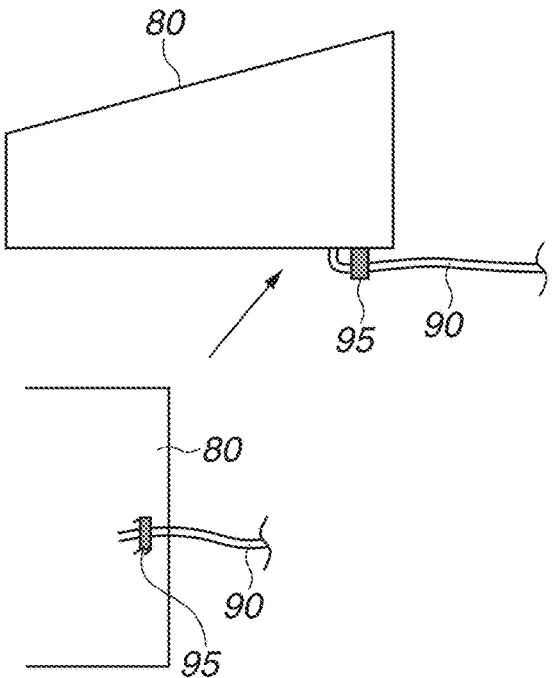

FIGS. 9A and 9B are diagrams used to explain a lead-out direction of the cable 90 led out from the operation unit 80. FIG. 9A is a schematic diagram illustrating the operation unit 80 as viewed from the left side of the operation unit 80. An example illustrated in FIG. 9A is an example of a configuration in which the cable 90 is led out from a wall portion on the far side of the operation unit 80.

In this way, since the cable 90 is led out from a wall portion on the far side of the operation unit 80, the cable 90 is unlikely to be visible by the user operating the operation unit 80, so that the user is enabled to focus on an operation on the operation unit 80.

Moreover, the top surface 109, on which the operation unit 80 is placed, is often used as a working space. Thus, while there is a situation in which the user performs work with a working material or a printed product placed by or in front of the operation unit 80, it is possible to prevent the cable 90 from becoming an encumbrance to the user.

In this way, since the cable 90 is led out from a wall portion on the far side of the operation unit 80, the operation unit 80 being freely placed on the top surface 109 enables improving workability.

An example illustrated in FIG. 9B is an example of a configuration in which the cable 90 is led out from the back side of the operation unit 80 and, moreover, the cable 90 is caused to extend toward the far side of the operation unit 80. As illustrated in FIG. 9B, the cable 90 is led out from the back side of the operation unit 80. On the side farther than the lead-out opening, a fastener 95 for fastening a part of the cable 90 to the operation unit 80 is provided. Since the fastener 95 is provided on the side farther than the lead-out opening, the cable 90 extends from the lead-out opening toward the far side of the operation unit 80. Even this configuration enables attaining an advantageous effect similar to the configuration for leading out the cable 90 from a wall portion on the far side of the operation unit 80.

Figure 10:
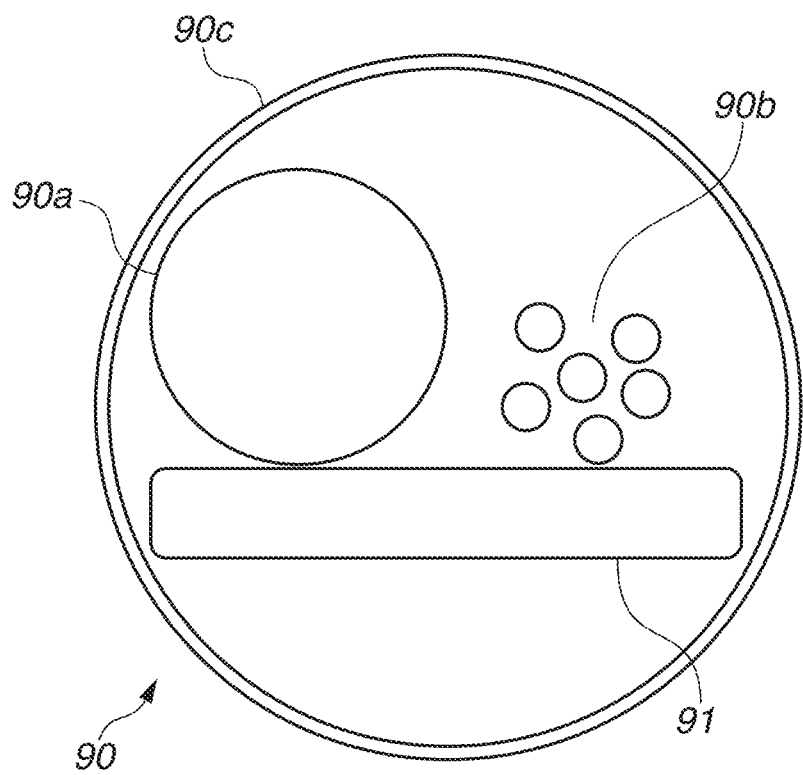
FIG. 10 is a sectional view of the cable.

FIG. 10 is a sectional view of the cable 90. As illustrated in FIG. 10, the cable 90 is configured with a video cable 90a (signal wire), a power cable 90b (electric power wire), a reinforcing member 91 (a type of rod-like member), and a covering 90c, which encloses therein the video cable 90a, the power cable 90b, and the reinforcing member 91. Here, the video cable 90a and the power cable 90b are collectively referred to as an "electric wire". Thus, the cable 90 is configured with the electric wire (90a and 90b), the reinforcing member 91, and the covering 90c, which encloses therein the electric wire (90a and 90b) and the reinforcing member 91.

The video cable 90a, the power cable 90b, and the reinforcing member 91 are respectively separate components, and are provided separate from and independent of each other. The covering 90c encloses therein such three members provided independent of each other. Thus, the cable 90 in the present exemplary embodiment has a configuration quite different from a cable with a double covering structure. The cable with a double covering structure is, for example, a cable having a structure configured with a signal wire, a first covering which encloses therein the signal wire, and a second covering which encloses therein the first covering. In a cable with such a structure, the signal wire and the first covering are configured as an integral cable. Thus, it is hard to say that the signal wire and the first covering are components separate from and independent of each other.

The video cable 90a interconnects the input-output circuit 76 of the image controller 710 and the driver board 81. A video signal (a type of electrical signal) is transmitted from the input-output circuit 76 to the driver board 81, so that the display panel 82 displays a video image based on the video signal. Moreover, an electrical signal which is transmitted through the video cable 90a is also a type of signal for instructing the image forming section 40 to perform image formation. The video cable 90a has a configuration in which a signal wire for transmitting a signal is covered with a covering material made from polyvinyl chloride.

The power cable 90b interconnects the power-supply device 17 of the apparatus body 10 and the driver board 81. Electric power is supplied to the operation unit 80 via the power cable 90b. This causes the driver board 81 to be driven, so that the display panel 82 displays a video image. The power cable 90b has a configuration in which an electric power wire for transmitting electric power is covered with a covering material made from polyvinyl chloride. Here, electric power which is supplied to the operation unit 80 via the power cable 90b is assumed to be also considered as a type of electrical signal.

The reinforcing member 91 is an elongated and plate-like member. Moreover, the reinforcing member 91 is made from plastic and thus has elasticity. The reinforcing member 91 is arranged along the video cable 90a and the power cable 90b. Although details are described below, the reinforcing member 91 has a function to prevent the video cable 90a and the power cable 90b from being broken.

The covering 90c encloses therein the video cable 90a, the power cable 90b, and the reinforcing member 91.

The covering 90c in the present exemplary embodiment is a member containing polyethylene terephthalate (PET) as a major ingredient and is also a reticular member having contractility. The elasticity of the covering 90c is far smaller than the elasticity of the reinforcing member 91. Thus, an influence which the elastic force of the covering 90c itself exerts on the entire cable 90 is almost zero. The main function of the covering 90c is to reduce the possibility that the video cable 90a, the power cable 90b, or the reinforcing member 91 becomes exposed to the outside, thus impairing the appearance of the cable 90. Since, in addition to such a main advantageous effect, the covering 90c in the present exemplary embodiment has contractility, the covering 90c also exerts an advantageous effect of bundling the video cable 90a, the power cable 90b, and the reinforcing member 91.

Thus, while, in the present exemplary embodiment, the covering 90c is used to improve a good appearance of the image forming system 1, this is not essential. Since some users may not require the good appearance as all that, the cable 90 only needs to be configured without the covering 90c being provided for such users.

<Fixation Method 1 for Cable>

Figure 11A:
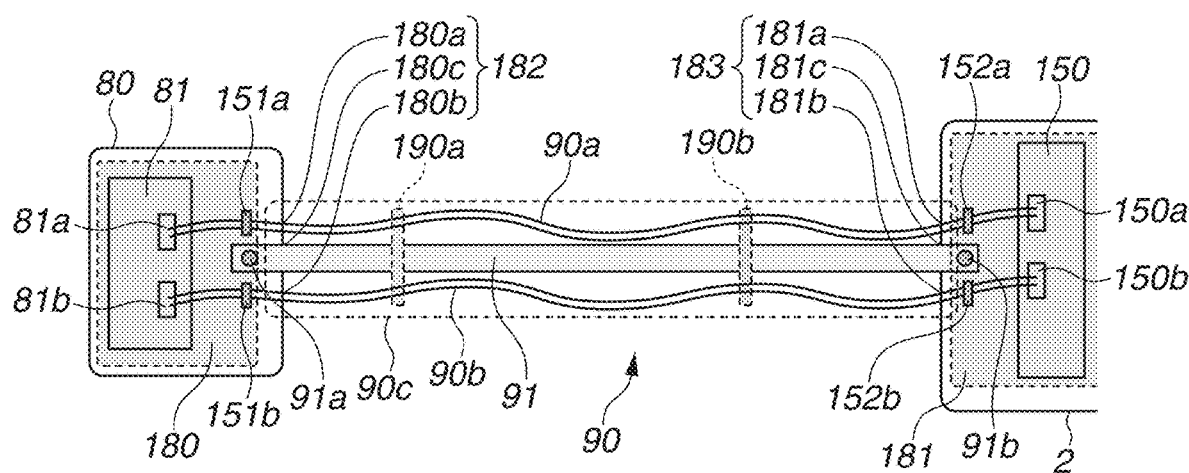
FIGS. 11A and 11B are diagrams used to explain a cable and a reinforcing member.
Figure 11B:
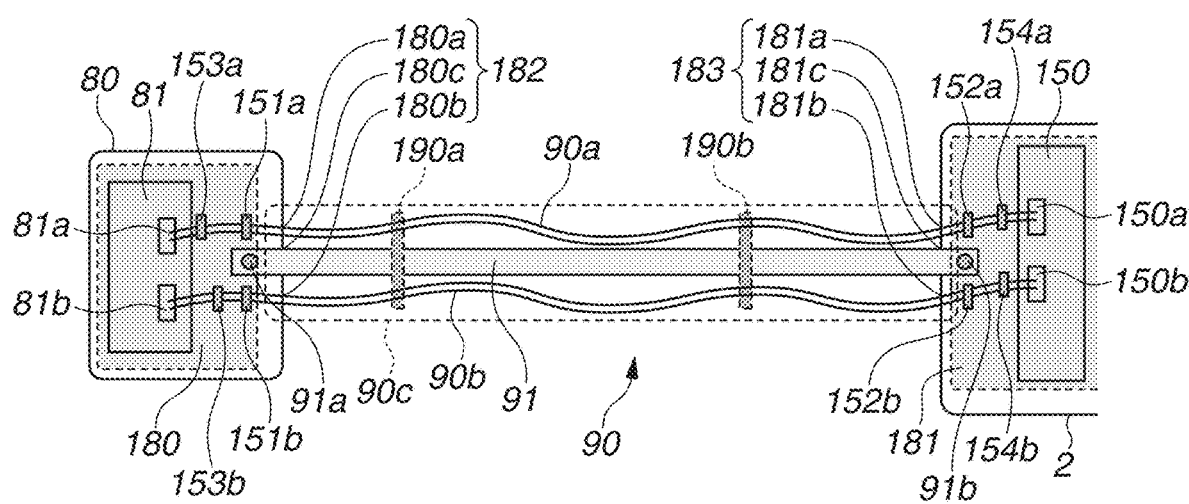

FIGS. 11A and 11B are diagrams used to explain a relationship in length between the video cable 90a, the power cable 90b, and the reinforcing member 91.

As illustrated FIG. 11A, one end side of the video cable 90a is connected to a connector 81a provided in the driver board 81. On the other hand, the other end side of the video cable 90a is connected to a connector 150a provided in a body board 150. The video cable 90a is electrically connected to the input-output circuit 76 of the image controller 710 via the connector 150a.

One end side of the video cable 90a is led out from a lead-out opening 180a provided in a frame 180 of the operation unit 80. Here, the frame 180 is, for example, an exterior cover which configures an exterior of the operation unit 80.

Additionally, at one end side of the video cable 90a, a portion between a portion connected to the connector 81a and a portion led out from the lead-out opening 180a is fixed to the frame 180 with, for example, a band 151a. The frame 180 as used here can be a part of the frame which configures an exterior cover or can be, for example, a metallic plate fixed to the exterior cover. Since the frame 180 is made to be a component separate from the exterior cover of the operation unit 80, a load occurring when the cable 90 is pulled is transmitted to the frame 180 via the band 151a. The driver board 81 is fixed to the frame 180 with, for example, a vis screw independently of the band 151a. Therefore, a load occurring when the cable 90 is pulled is not directly transmitted to the connector 81a but transmitted to the connector 81a once via the frame 180. Since the frame 180 is made to be a metallic plate to also secure rigidity, it is possible to reduce the possibility that the connector 81a drops out of the driver board 81 or has a loose connection. This also applies to a relationship between the video cable 90a and a frame 181 and a relationship between the power cable 90b and each of the frame 180 and the frame 181.

The band 151a in the present exemplary embodiment is a banding band, which fixes the video cable 90a to the frame 180 by closely surrounding the video cable 90a. Furthermore, the band 151a does not need to be a banding band, and can be any other component which is able to fix the video cable 90a to the frame 180. For example, a wire saddle can be used as the band 151a. In this way, since the video cable 90a is fixed to the frame 180 with the band 151a, even when a portion exposed from the lead-out opening 180a of the video cable 90a is pulled, no load is applied to the connector 81a, so that it is possible to reduce the possibility that the video cable 90a drops out of the connector 81a.

Similarly, at the other end side of the video cable 90a, a portion between a portion connected to the connector 150a and a portion led out from the lead-out opening 181a is fixed to the frame 181 with, for example, a band 152a. The frame 181 as used here can be a part of the frame which configures an exterior cover of the casing of the image forming apparatus 2 or can be, for example, a metallic plate fixed to the exterior cover. The band 152a in the present exemplary embodiment is a banding band, which fixes the video cable 90a to the frame 181 by closely surrounding the video cable 90a. In this way, since the video cable 90a is fixed to the frame 181 with the band 152a, even when a portion exposed from the lead-out opening 181a of the video cable 90a is pulled, no load is applied to the connector 150a, so that it is possible to reduce the possibility that the video cable 90a drops out of the connector 150a.

Next, a method for fixing the power cable 90b to the operation unit 80 and the image forming apparatus 2 is described.

As illustrated in FIG. 11A, one end side of the power cable 90b is connected to a connector 81b provided in the driver board 81. On the other hand, the other end side of the power cable 90b is connected to a connector 150b provided in the body board 150. The power cable 90b is electrically connected to the power-supply device 17 via the connector 150b.

One end side of the power cable 90b is led out from a lead-out opening 180b provided in the frame 180 of the operation unit 80. Here, the frame 180 is, for example, an exterior cover which configures an exterior of the operation unit 80.

Additionally, at one end side of the power cable 90b, a portion between a portion connected to the connector 81b and a portion led out from the lead-out opening 180b is fixed to the frame 180 with, for example, a band 151b. The frame 180 as used here can be a part of the frame which configures an exterior cover or can be, for example, a metallic plate fixed to the exterior cover. The band 151b in the present exemplary embodiment is a banding band, which fixes the power cable 90b to the frame 180 by closely surrounding the power cable 90b. Furthermore, the band 151b does not need to be a banding band, and can be any other component which is able to fix the power cable 90b to the frame 180. For example, a wire saddle can be used as the band 151b. In this way, since the power cable 90b is fixed to the frame 180 with the band 151b, even when a portion exposed from the lead-out opening 180b of the power cable 90b is pulled, no load is applied to the connector 81b, so that it is possible to reduce the possibility that the power cable 90b drops out of the connector 81b.

Similarly, at the other end side of the power cable 90b, a portion between a portion connected to the connector 150b and a portion led out from the lead-out opening 181b is fixed to the frame 181 with, for example, a band 152b. The frame 181 as used here can be a part of the frame which configures an exterior cover of the casing of the image forming apparatus 2 or can be, for example, a metallic plate fixed to the exterior cover. The band 152b in the present exemplary embodiment is a banding band, which fixes the power cable 90b to the frame 181 by closely surrounding the power cable 90b. In this way, since the power cable 90b is fixed to the frame 181 with the band 152b, even when a portion exposed from the lead-out opening 181b of the power cable 90b is pulled, no load is applied to the connector 150b, so that it is possible to reduce the possibility that the power cable 90b drops out of the connector 150b.

Next, a method for fixing the reinforcing member 91 to the operation unit 80 and the image forming apparatus 2 is described. Furthermore, details of a configuration of the reinforcing member 91 itself are described below.

As illustrated in FIG. 11A, one end side of the reinforcing member 91 is fixed to the frame 180 of the operation unit 80 with, for example, a vis screw 91a. Moreover, the other end side of the reinforcing member 91 is fixed to the frame 181 of the image forming apparatus 2 with, for example, a vis screw 91b. Out of portions of the reinforcing member 91, each of a portion fixed to the frame 180 with the vis screw 91a and a portion fixed to the frame 181 with the vis screw 91b is referred to as a "fixation portion".

One end side of the reinforcing member 91 is led out from a lead-out opening 180c provided in the frame 180 of the operation unit 80. Here, the frame 180 is, for example, an exterior cover which configures an exterior of the operation unit 80. However, the frame 180 as used here can be, for example, a metallic plate fixed to the exterior cover.

Similarly, the other end side of the reinforcing member 91 is fixed to the frame 181 of the image forming apparatus 2 with, for example, the vis screw 91b. However, the frame 181 as used here can be, for example, a metallic plate fixed to the exterior cover.

As described above, each of the video cable 90a, the power cable 90b, and the reinforcing member 91 is fixed to the frame 180 of the operation unit 80 and the frame 181 of the image forming apparatus 2.

Here, a portion at which the video cable 90*a* is fixed to the frame 180 with the band 151*a* is referred to as a "(one end side) fixed end", and a portion at which the video cable 90*a* is fixed to the frame 181 with the band 152*a* is referred to as an "(other end side) fixed end". Then, with regard to the video cable 90*a*, a distance from the (one end side) fixed end to the (other end side) fixed end is assumed to be L1. Moreover, a portion at which the power cable 90*b* is fixed to the frame 180 with the band 151*b* is referred to as a "(one end side) fixed end", and a portion at which the power cable 90*b* is fixed to the frame 181 with the band 152*b* is referred to as an "(other end side) fixed end". Then, with regard to the power cable 90*b*, a distance from the (one end side) fixed end to the (other end side) fixed end is assumed to be L2. Moreover, a portion at which the reinforcing member 91 is fixed to the frame 180 with the vis screw 91*a* is referred to as a "(one end side) fixed end", and a portion at which the reinforcing member 91 is fixed to the frame 181 with the vis screw 91*b* is referred to as an "(other end side) fixed end". Then, with regard to the reinforcing member 91, a distance from the (one end side) fixed end to the (other end side) fixed end is assumed to be L3. At this time, in the present exemplary embodiment, the distance L3 is set shorter than each of the cable lengths L1 and L2. In other words, even in a state in which the reinforcing member 91 stretches without deflection, a deflection (surplus length) occurs in a region between the (one end side) fixed end and the (other end side) fixed end of the video cable 90*a*. Similarly, a deflection (surplus length) also occurs in a region between the (one end side) fixed end and the (other end side) fixed end of the power cable 90*b*. In this way, as also illustrated in FIG. 11A, a surplus length is provided at each of a portion from the (one end side) fixed end to the (other end side) fixed end of the video cable 90*a* and a portion from the (one end side) fixed end to the (other end side) fixed end of the power cable 90*b*. As described below, the reinforcing member 91 is an elastically deformable member made from plastic and the cable 90 is also deformable. The distances L1 to L3 are set to have the above-mentioned relationship in such a manner that, even when the cable 90 is deformed, the video cable 90*a* and the power cable 90*b* are not broken.

Furthermore, in the above-described example, one end side of the video cable 90*a* is fixed to the frame 180 with the band 151*a*, and the other end side of the video cable 90*a* is fixed to the frame 181 with the band 152*a*. Moreover, one end side of the power cable 90*b* is fixed to the frame 180 with the band 151*b*, and the other end side of the power cable 90*b* is fixed to the frame 181 with the band 152*b*. However, for example, a configuration in which only one side of the power cable 90*b* is not fixed to the frame 180 can be employed. Even in this case, since one end side of the video cable 90*a* is fixed to the frame 180 with the band 151*a* and the other end side of the video cable 90*a* is fixed to the frame 181 with the band 152*a*, even in a case where the cable 90 is deformed, it is possible to reduce the possibility that at least the video cable 90*a* is broken.

Moreover, without the use of components such as the bands 151*a*, 151*b*, 152*a*, and 152*b*, fixed ends can be formed by, for example, winding a part of the video cable 90*a* or the power cable 90*b* around a part of the frame 180 or 181.

Finally, the covering 90*c*, which is one of constituent components of the cable 90, is described. The covering 90*c* encloses therein the video cable 90*a*, the power cable 90*b*, and the reinforcing member 91. One end side of the covering 90*c* is led out from a lead-out opening 182 formed in the frame 180. Here, the lead-out opening 182 is configured with various lead-out openings 180*a* to 180*c*. Thus, while the lead-out openings 180*a* to 180*c* have been described above on an individual basis, these openings can be configured to be a single common opening. The covering 90*c* is a member which is able to contract when receiving heat, so that applying heat to the covering 90*c*, into which the video cable 90*a*, the power cable 90*b*, and the reinforcing member 91 have been inserted, enables bringing together the video cable 90*a*, the power cable 90*b*, and the reinforcing member 91 into a single bundle.

On the other hand, the other end side of the covering 90*c* is led out from a lead-out opening 183 formed in the frame 181. Here, the lead-out opening 183 is configured with various lead-out openings 181*a* to 181*c*. Thus, while the lead-out openings 181*a* to 181*c* have been described above on an individual basis, these openings can be configured to be a single common opening. The covering 90*c* is a member which is able to contract when receiving heat, so that applying heat to the covering 90*c*, into which the video cable 90*a*, the power cable 90*b*, and the reinforcing member 91 have been inserted, enables bringing together the video cable 90*a*, the power cable 90*b*, and the reinforcing member 91 into a single bundle.

The covering 90*c* is a member smaller in elasticity than the reinforcing member 91. Therefore, an influence which the covering 90*c* exerts on the stiffness of the cable 90 is almost zero. The covering 90*c* in the present exemplary embodiment has an advantageous effect of hiding the video cable 90*a*, the power cable 90*b*, and the reinforcing member 91 from the outside by enclosing them therein. This enables preventing the good appearance of the operation unit 80 from decreasing due to the various cables being exposed to the outside. However, hiding the various cables does not need to mean making the video cable 90*a* and the power cable 90*b* fully invisible. As can be seen from the covering 90*c* in the present exemplary embodiment being a reticular member having contractility, a configuration in which parts of the video cable 90*a* and the power cable 90*b* are slightly viewable from the outside can also be employed. Thus, the covering 90*c* enclosing therein the video cable 90*a* and the power cable 90*b* means bringing together various cables into a single bundle and preventing major portions thereof from being exposed to the outside.

As illustrated in FIG. 11A, the video cable 90*a* and the power cable 90*b* are bundled together with the reinforcing member 91 inside the covering 90*c* by a band 190*a* and a band 190*b*, and are fixed to the reinforcing member 91. With this structure, even when a force for stretching the cable 90 is applied to the cable 90 at a portion thereof between the band 190*a* and the band 190*b*, it is possible to reduce the possibility that the video cable 90*a* or the power cable 90*b* is broken at that portion.

Figure 12A:
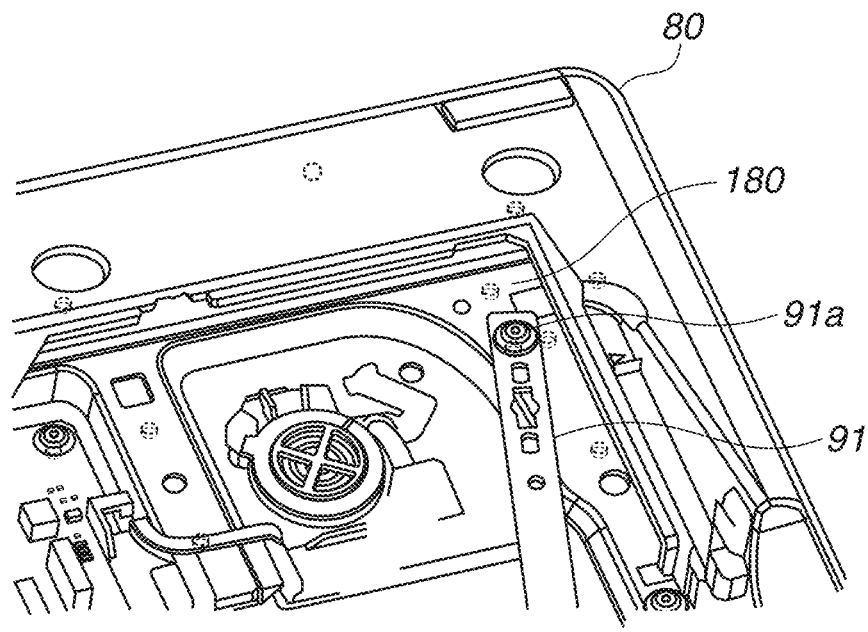
FIGS. 12A and 12B are diagrams illustrating fixation places of the reinforcing member being fixed to the operation unit and the image forming apparatus, respectively.
Figure 12B:
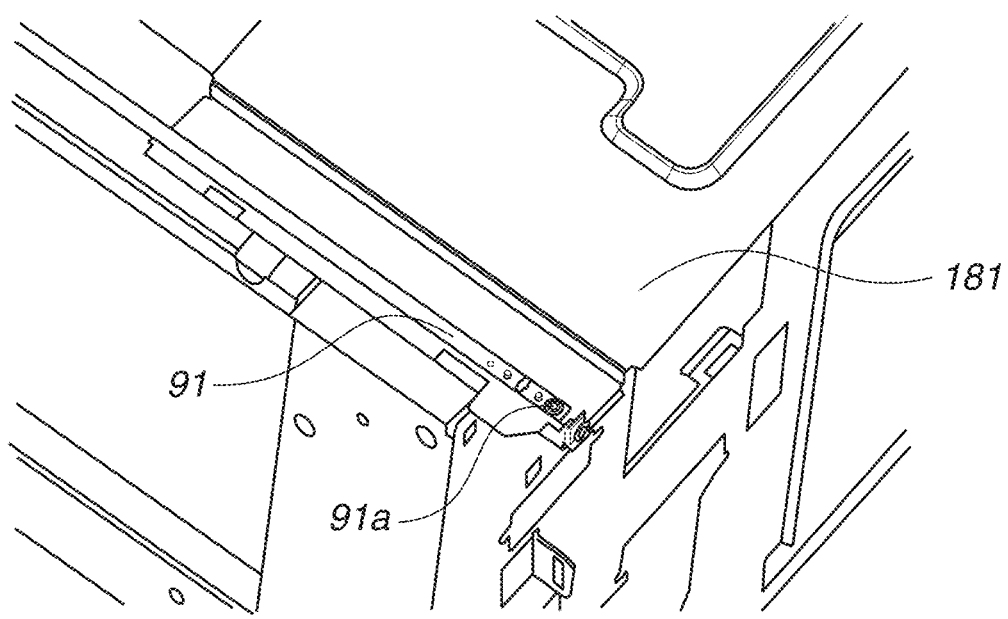

Moreover, FIGS. 12A and 12B illustrate specific fixation destinations of the video cable 90*a*, the power cable 90*b*, and the reinforcing member 91. As illustrated in FIG. 12A, in the present exemplary embodiment, the frame 180 is a metallic plate which becomes exposed when an exterior cover on the back side of the operation unit 80 is detached. One end side of the reinforcing member 91 is fixed to the exposed metallic plate. Furthermore, although not illustrated, one end side of each of the video cable 90*a* and the power cable 90*b* is also fixed to the exposed metallic plate.

Moreover, as illustrated in FIG. 12B, in the present exemplary embodiment, the frame 181 is a metallic plate which becomes exposed when an exterior cover of the top surface 109 of the image forming apparatus 2 is detached. The other end side of the reinforcing member 91 is fixed to the exposed metallic plate. Furthermore, although not illustrated, the other end side of each of the video cable 90a and the power cable 90b is also fixed to the exposed metallic plate.

<Fixation Method 2 for Cable>

Next, a configuration in which each of one end side of the video cable 90a and one end side of the power cable 90b is fixed at a plurality of portions and, moreover, each of the other end side of the video cable 90a and the other end side of the power cable 90b is fixed at a plurality of portions is described.

FIG. 11B is a diagram used to explain a relationship in length between the video cable 90a, the power cable 90b, and the reinforcing member 91.

As illustrated in FIG. 11B, one end side of the video cable 90a is also fixed to the frame 180 with a band 153a in addition to the band 151a. Moreover, the other end side of the video cable 90a is also fixed to the frame 181 with a band 154a in addition to the band 152a. In this way, since one end side and the other end side of the video cable 90a are respectively fixed to the frame 180 and the frame 181 at a plurality of portions, this configuration fixes the video cable 90a to the frame 180 and the frame 181 more reliably than the above-described configuration in which those are fixed at a single portion. In this case, the above-mentioned (one end side) fixed end of the video cable 90a refers to a portion fixed to the frame 180 with the band 151a of the video cable 90a. Moreover, the (other end side) fixed end of the video cable 90a refers to a portion fixed to the frame 181 with the band 152a of the video cable 90a. In the present exemplary embodiment, the concept of "fixed end" indicates a portion closest to the lead-out opening when there is a plurality of fixation portions. Even in a case where there are three or more fixation portions, a portion closest to the lead-out opening is considered as a fixed end. Thus, a band which first receives a load when a portion exposed from the lead-out end of the video cable 90a is pulled configures a fixed Send.

Moreover, as illustrated in FIG. 11B, the other end side of the power cable 90b is also fixed to the frame 180 with a band 153b in addition to the band 151b. Moreover, the other end side of the power cable 90b is also fixed to the frame 181 with a band 154b in addition to the band 152b. In this way, since one end side and the other end side of the power cable 90b are respectively fixed to the frame 180 and the frame 181 at a plurality of portions, this configuration fixes the power cable 90b to the frame 180 and the frame 181 more reliably than the above-described configuration in which those are fixed at a single portion. In this case, the above-mentioned (one end side) fixed end of the power cable 90b refers to a portion fixed to the frame 180 with the band 151b of the power cable 90b. Moreover, the (other end side) fixed end of the power cable 90b refers to a portion fixed to the frame 181 with the band 152b of the power cable 90b. In the present exemplary embodiment, the concept of "fixed end" indicates a portion closest to the lead-out opening when there is a plurality of fixation portions. Even in a case where there are three or more fixation portions, a portion closest to the lead-out opening is considered as a fixed end. Thus, a band which first receives a load when a portion exposed from the lead-out end of the power cable 90b is pulled configures a fixed end.

<Reinforcing Member>

Figure 13A:
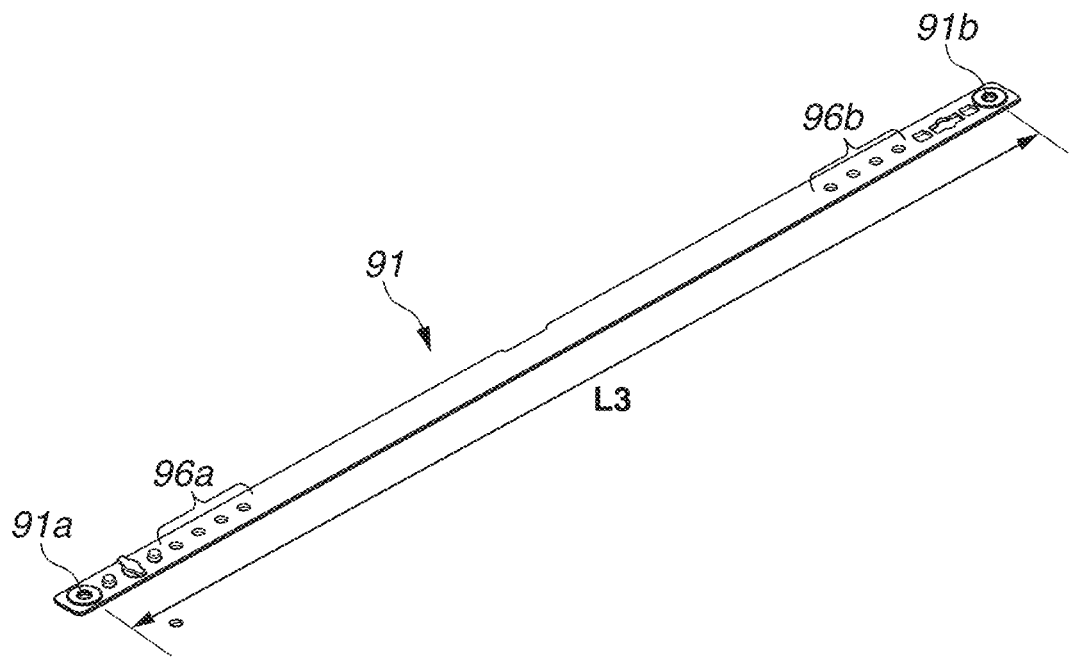
FIGS. 13A and 13B are diagrams used to explain a shape of the reinforcing member.

FIG. 13A is a perspective view of the reinforcing member 91. The reinforcing member 91 is an elongated member, the material of which is plastic such as nylon. Therefore, the reinforcing member 91 is deformable. Since the reinforcing member 91 is deformable, the user is allowed to change the position of the operation unit 80 without so feeling a load. In this way, even in the case of deflecting the cable 90, the user does not so feel resilience of the elastically deformed reinforcing member 91. Furthermore, the reinforcing member 91 in the present exemplary embodiment is a plate-like rod member, but can be a cylindrical member. Thus, the shape of the reinforcing member 91 can be a plate-like shape or a cylindrical shape as long as the reinforcing member 91 has elasticity.

At one end side of the reinforcing member 91, a plurality of openings 96a is formed, and the vis screw 91a is inserted into one of the plurality of openings 96a. In this way, the reinforcing member 91 is fixed to the frame 180. Moreover, at the other end side of the reinforcing member 91, a plurality of openings 96b is formed, and the vis screw 91b is inserted into one of the plurality of openings 96b. In this way, the reinforcing member 91 is fixed to the frame 181. Here, a distance denoted by L3 in FIG. 13A represents a distance from the (one end side) fixed end to the (other end side) fixed end of the reinforcing member 91. Changing openings into which to insert the vis screw 91a and the vis screw 91b out of the plurality of openings 96a and the plurality of openings 96b formed in the reinforcing member 91 enables changing the distance L3. The required length of the cable 90 may differ depending on users. Therefore, in this way, a configuration which allows changing the length of the cable 90 according to the request of the user is employed.

Figure 13B:
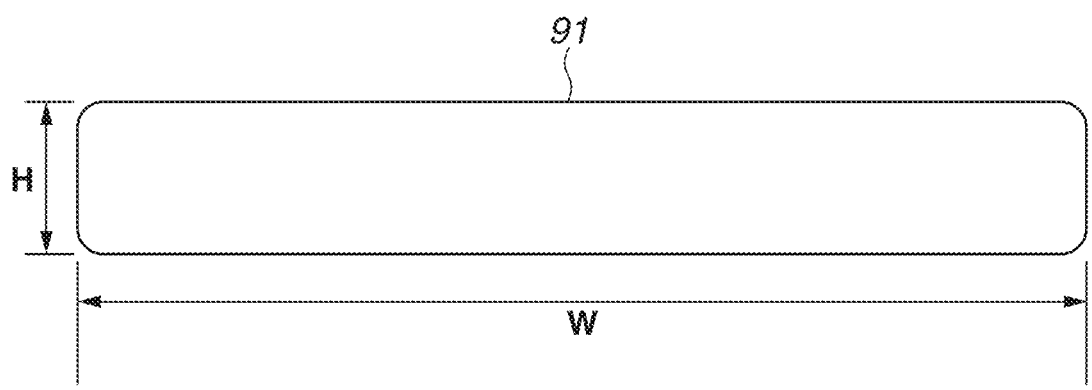

FIG. 13B is a diagram used to explain the shape of the reinforcing member 91. The cross-section of the reinforcing member 91 is rectangular as illustrated in FIG. 13B. The reinforcing member 91 is 10 millimeters (mm) in width W, 1.5 mm in thickness H, and 367.5 mm in total length, so that the value of the width W is larger than that of the thickness H. Thus, the reinforcing member 91 is a rod-like member. Since the reinforcing member 91 is made rod-like, the elastic force of the reinforcing member 91 occurring when the wide surface at one end side of the reinforcing member 91 is brought close to the wide surface at the other end side thereof is smaller than the elastic force of the reinforcing member 91 occurring when a surface configuring a thickness at one end side of the reinforcing member 91 is brought close to a surface configuring a thickness at the other end side thereof. Thus, it is possible to make the elastic force occurring when the reinforcing member 91 is deflected in a direction perpendicular to the wide surface different from the elastic force occurring when the reinforcing member 91 is deflected in a direction perpendicular to a surface configuring a thickness of the reinforcing member 91. Particularly, making the thickness of the reinforcing member 91 smaller enables setting smaller the elastic force occurring when the reinforcing member 91 is deflected in a direction perpendicular to the wide surface. This enables implementing a cable 90 which has both a configuration which is readily bendable and a configuration which is robust over torsion described below. Therefore, a load occurring at the time of moving the operation unit 80 is reduced for the user. Additionally, any breaking of an electric wire occurring in a case where the cable 90 has been twisted by mistake is prevented or reduced.

Figure 14A:
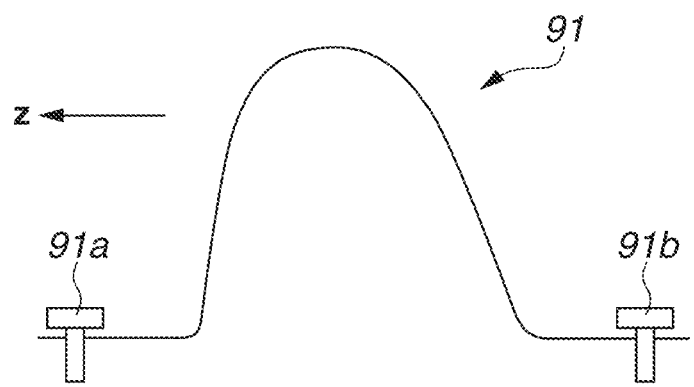
FIGS. 14A, 14B, and 14C are diagrams used to explain a measuring method for the elasticity of the reinforcing member.

FIG. 14A is a diagram used to explain a state in which the reinforcing member 91 has been deflected. The deformation of the reinforcing member 91 causes a reaction force to occur in the Z-direction. Since the reinforcing member 91 has elasticity, it is possible to reduce the possibility of the user deflecting or twisting the cable 90 more than necessary. This is because, since the reinforcing member 91 has elasticity, the user experiences a feeling of strangeness when gradually deflecting or twisting the cable 90. This enables reducing the possibility that the video cable 90a or the power cable 90b is broken.

Figure 14B:
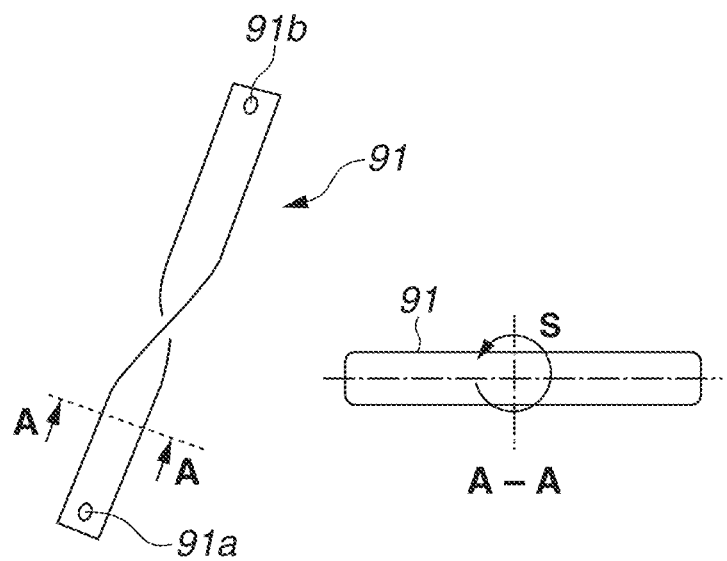

Here, a method of measuring the elasticity of the reinforcing member 91 is described. As an instrument for measurement, a torque gauge (ATG3CN) manufactured by TOHNICHI Mfg. Co., Ltd. was used. At the time of measurement, first, the method fixes one end side of the reinforcing member 91 to a jig to bring such a side into an immovable state. Under that state, the method fixes the other end side of the reinforcing member 91 to the torque gauge. At this time, a portion fixed to the torque gauge is located on an extension line passing through a portion fixed to the jig and parallel to the longitudinal direction of the reinforcing member 91. Under that state, as illustrated in FIG. 14B, the method gradually twists the reinforcing member 91 with the torque gauge. Thus, the method gradually twists the reinforcing member 91 with the longitudinal direction of the reinforcing member 91 as an axis of rotation. The direction in which to twist the reinforcing member 91 is the direction of arrow S illustrated in an A-A sectional view included in FIG. 14B. The value obtained by measurement using this method is defined as the elasticity (first elasticity) of the reinforcing member 91. In the present exemplary embodiment, the elasticity of the reinforcing member 91 is about 4.6 centinewton meters (cN·m). According to the inventor's experiment, if the elasticity of the reinforcing member 91 is such a value, the user experiences a feeling of strangeness when twisting the cable 90 by a predetermined amount, specifically, for three turns. Moreover, according to the inventor's experiment, if the cable 90 is twisted for five or more turns, the possibility of the video cable 90a or the power cable 90b being broken increases. Causing the user to experience a feeling of strangeness prior to that stage enables reducing the possibility that the user twists the cable 90 more than necessary to cause breaking of the video cable 90a or the power cable 90b.

The elasticity of the electric wire (the video cable 90a or the power cable 90b) is also defined in a similar way. First, the method fixes one end side of the electric wire to a jig to bring such a side into an immovable state. Under that state, the method fixes the other end side of the electric wire to the torque gauge. At this time, a portion fixed to the torque gauge is located on an extension line passing through a portion fixed to the jig and parallel to the longitudinal direction of the electric wire. The longitudinal direction of the electric wire is a direction in which the electric wire extends when the electric wire is stretched without deflection. Under that state, the method gradually twists the electric wire with the torque gauge. Thus, the method gradually twists the electric wire with the longitudinal direction of the electric wire as an axis of rotation. The value obtained by measurement using this method is defined as the elasticity (second elasticity) of the electric wire. The value of the elasticity of the reinforcing member 91 is larger than that of the elasticity of the electric wire. Thus, when the reinforcing member 91 and the electric wire are twisted by a predetermined amount, for example, for three turns, in the above-mentioned method, the value shown by the torque gauge is larger in the case of the reinforcing member 91 than in the case of the electric wire.

Figure 14C:
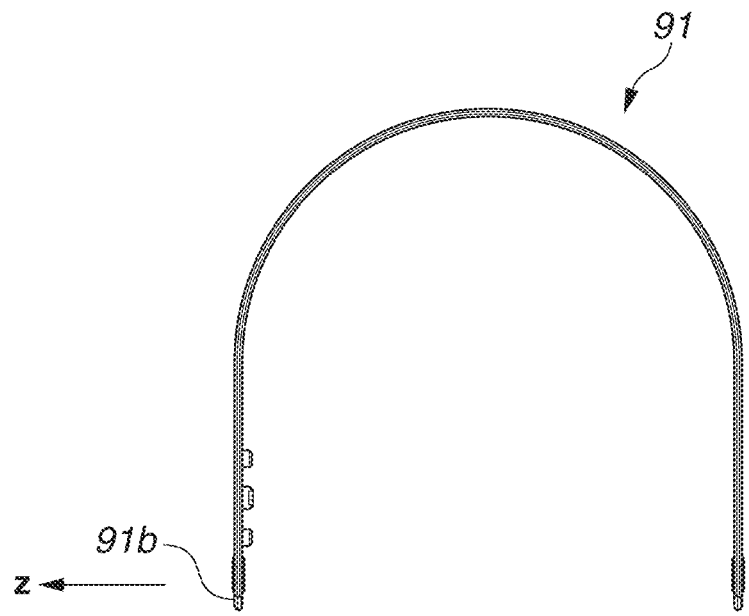

Moreover, a reaction force of the reinforcing member 91 occurring when the elasticity of the reinforcing member 91 measured in the above-mentioned method is 4.6 cN·m is about 34 gram-force (gf). The reaction force as used here is a reaction force of the reinforcing member 91 occurring when a surface at one end side of the reinforcing member 91 and a surface at the other end side thereof are gradually brought close to each other without the reinforcing member 91 being twisted and these surfaces have entered into a relationship of being opposite to and parallel to each other, as illustrated in FIG. 14C.

According to the inventor's experiment, when the reinforcing member 91 is gradually deflected and the reaction force of the reinforcing member 91 has exceeded 34 gf, the user experiences a feeling of strangeness. Therefore, the possibility that the user performs an operation of folding back the cable 90 more than necessary is reduced. As mentioned above, if the elasticity of the reinforcing member 91 is ensured to be 4.6 cN·m, it is possible to reduce the possibility that an electric wire included in the cable 90 is broken, while securing the readiness of movement of the operation unit 80.

Moreover, the elasticity of the covering 90c can also be measured and defined with use of a torque gauge. The measuring method for that is the same as the above-mentioned measuring method for the elasticity of the reinforcing member 91. First, the method fixes one end side of the covering 90c to a jig to bring such a side into an immovable state. Under that state, the method fixes the other end side of the covering 90c to the torque gauge. At this time, a portion fixed to the torque gauge is located on an extension line passing through a portion fixed to the jig and parallel to the longitudinal direction of the covering 90c. The longitudinal direction of the covering 90c is a direction in which the covering 90c extends when the covering 90c is stretched without deflection. Under that state, the method gradually twists the covering 90c with the torque gauge. Thus, the method gradually twists the covering 90c with the longitudinal direction of the covering 90c as an axis of rotation. The value obtained by measurement using this method is defined as the elasticity (third elasticity) of the covering 90c. The value of the elasticity of the electric wire is larger than that of the elasticity of the covering 90c. Thus, when the electric wire and the covering 90c are twisted by a predetermined amount, for example, for three turns, in the above-mentioned method, the value shown by the torque gauge is larger in the case of the electric wire than in the case of the covering 90c.

Furthermore, in making a comparison in elasticity between the reinforcing member 91, the electric wire, and the covering 90c, the method performs measurement with the total lengths of the respective members set equal to each other.

Since the elasticity of the covering 90c is far smaller than the elasticity of each of the reinforcing member 91 and the electric wire, a "stiffness" which the user feels when gradually bending the cable 90 is ascribable to the reinforcing member 91. Thus, the covering 90c has almost no influence on the stiffness of the cable 90.

<Connection Configuration of Reinforcing Member>

With regard to the length of the cable 90 to be connected to the operation unit 80, various cases are supposed depending on the size of the image forming system 1 or the usage by the user. For example, in a case where one image forming system is used by a plurality of user, since there is a situation in which one user shows the screen of the operation unit 80 to another user, a configuration in which the operation unit 80 is able to be moved within a relatively broad space is required. On the other hand, in the case of a user who operates the operation unit 80 only within a limited location on the top surface 109, there is no need to be able to move the operation unit 80 within so broad a space. It is difficult to predict what needs users have in the market or what type of usage becomes mainstream in the future. Therefore, to enable coping with various users or usage conditions, a configuration which allows adjustment of the length of the cable 90 is currently required.

To enable adjusting the length of the cable 90, it is necessary to cause the length of the reinforcing member 91 to be also able to be adjusted. However, if a plurality of types of reinforcing members 91 different in length is prepared in advance, the cost for preparing molds for manufacturing reinforcing members 91 or the cost for managing the produced various reinforcing members 91 for every length may be incurred. To solve such issues, a configuration capable of connecting reinforcing members 91 to each other to adjust the whole length of the reinforcing members 91 is employed.

Figure 15:
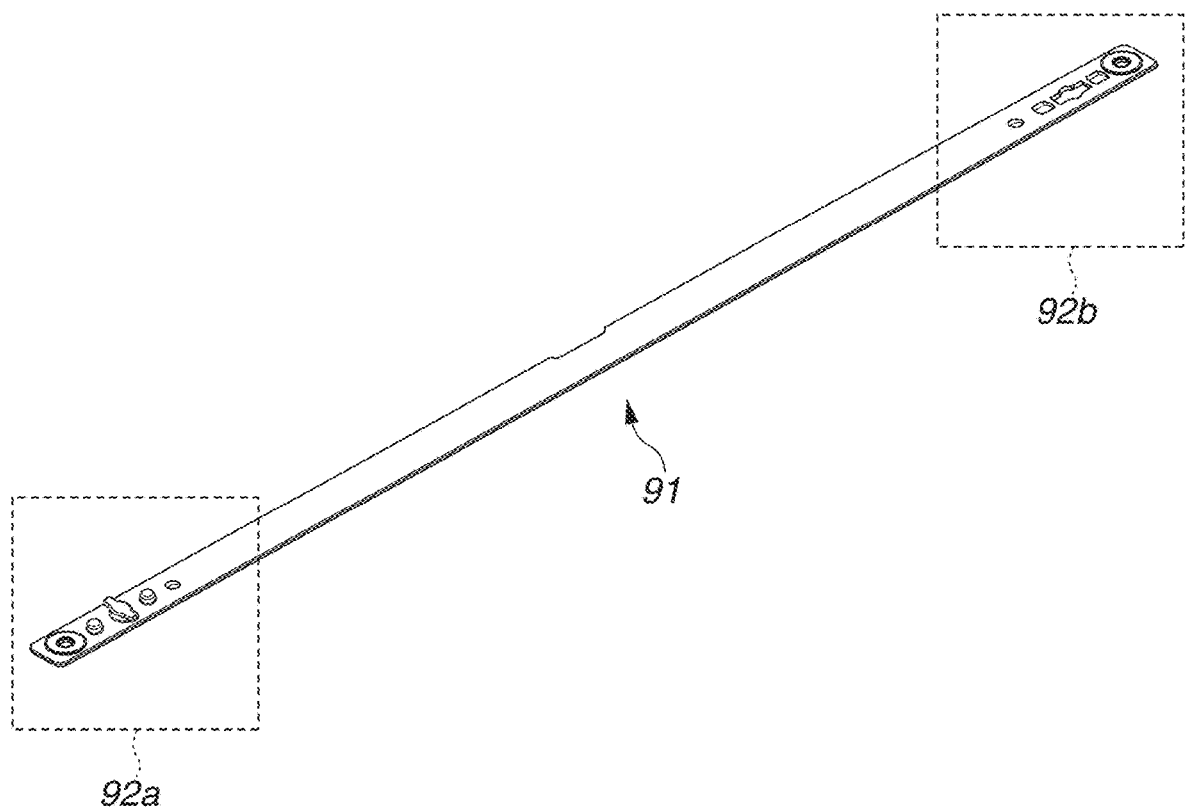
FIG. 15 is a perspective view of the reinforcing member.

FIG. 15 is a perspective view of a reinforcing member 91. Projections are formed at one end side 92a of the reinforcing member 91, and opening are formed at the other end side 92b of the reinforcing member 91. The projections of a reinforcing member 91 are fitted into the openings of another reinforcing member 91, thus completing connection of two reinforcing members 91.

Figure 16A:
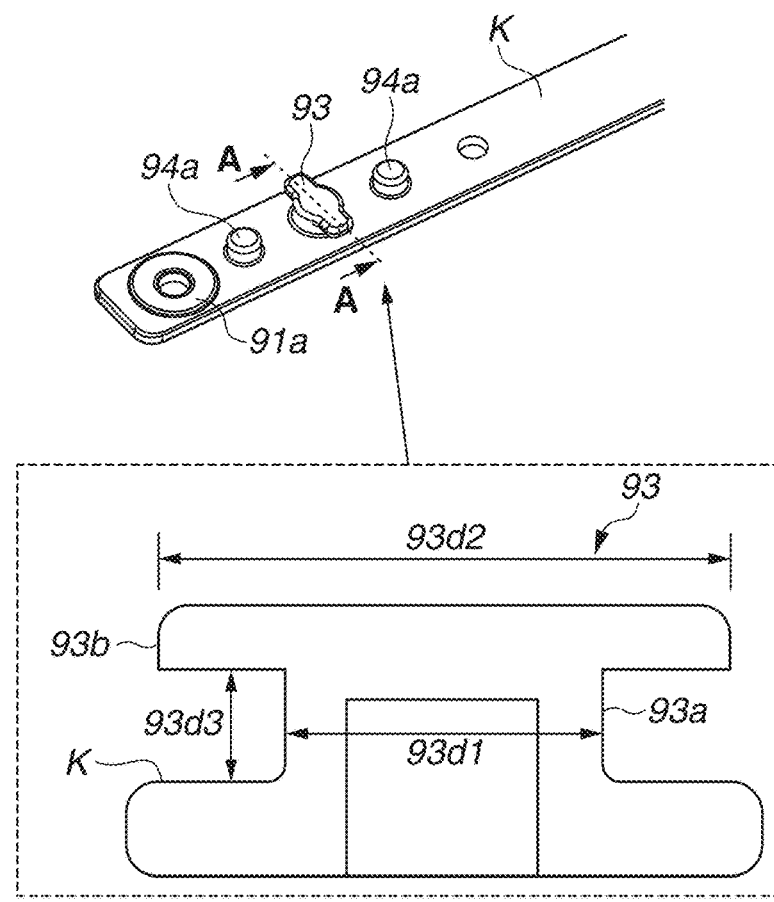
FIGS. 16A and 16B are diagrams used to explain a configuration of the reinforcing member.

FIG. 16A is a diagram used to explain the details of the one end side 92a of the reinforcing member 91.

As illustrated in FIG. 16A, projections 94a and a fixing boss (an example of an engagement portion) 93 are provided at the one end side 92a of the reinforcing member 91. Moreover, a sectional view of the fixing boss 93 taken along line A-A is included in FIG. 16A. A cylindrical shape 93a is formed in such a way as to project from a surface K, which is the front surface of the reinforcing member 91. The cylindrical shape 93a configures a region 93d3. An umbrella shape 93b is formed at the upper end portion of the cylindrical shape 93a. The width 93d2 of the umbrella shape 93b is larger than the width 93d1 of the cylindrical shape 93a. Moreover, the region 93d3 is formed to be larger than the thickness H of the reinforcing member 91.

Figure 16B:
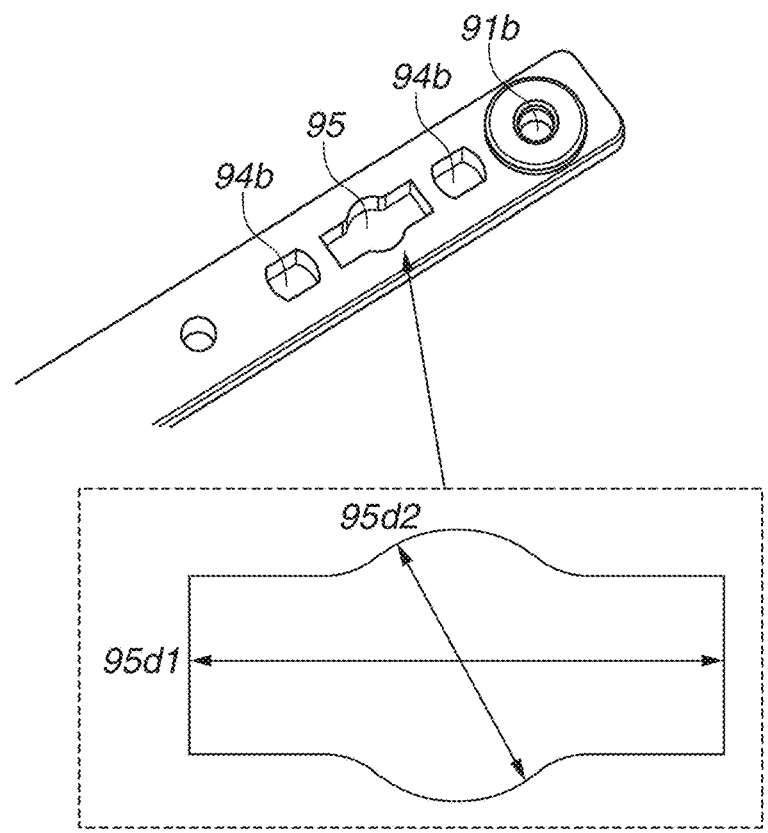

FIG. 16B is a diagram used to explain the details of the other end side 92b of the reinforcing member 91.

At the other end side 92b of the reinforcing member 91, openings 94b and a hook hole 95, with which the projections 94a and the fixing boss 93 provided at the one end side 92a of the reinforcing member 91 engage, are provided.

The hook hole 95 has a width 95d1, which is a size larger than or equal to the width 93d2 of the umbrella shape 93b, to enable the umbrella shape 93b to pass through the hook hole 95. Moreover, the hook hole 95 has a width 95d2, which is larger than or equal to the width 93d1 of the cylindrical shape 93a and which is smaller than the width 93d2 of the umbrella shape 93b. The fixing boss 93 engages with the hook hole 95.

Figure 17A:
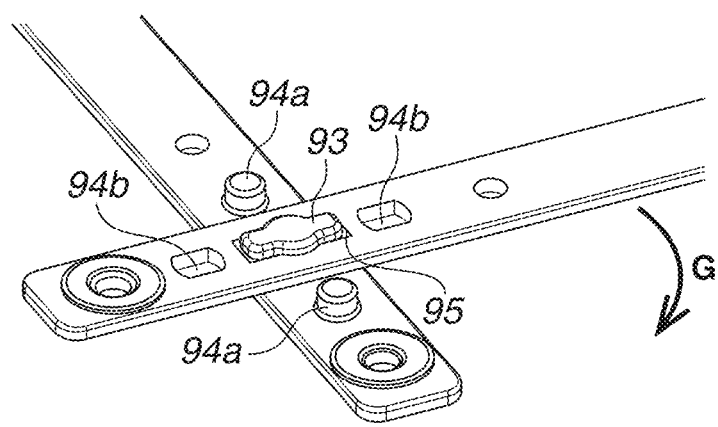
FIGS. 17A, 17B, and 17C are diagrams used to explain a connection configuration of the reinforcing member.

Next, a method of coupling reinforcing members 91 to each other is described with reference to FIGS. 17A, 17B, and 17C. As described here, a plurality of interconnected reinforcing members 91 can be considered collectively as a single reinforcing member. In this case, the reinforcing member can be deemed to include a plurality of interconnected members (a single reinforcing member). FIG. 17A is a diagram illustrating a state in which the umbrella shape 93b of the reinforcing member 91 has been fitted in the hook hole 95. Under this state, the method turns one reinforcing member 91 in the direction of arrow G around the fixing boss 93 as a center of rotation.

Figure 17B:
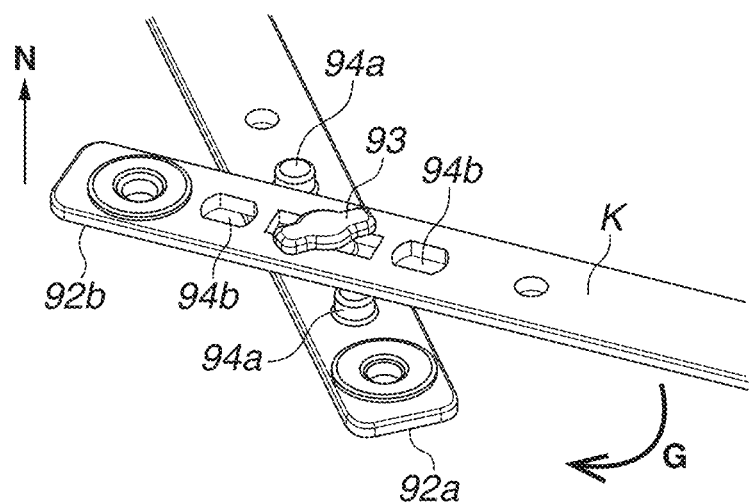

FIG. 17B illustrates a state in which the method gradually turns one reinforcing member 91 relative to the other reinforcing member 91, so that the projections 94a of the other reinforcing member 91 have come into contact with one reinforcing member 91. Under from this state, as the method further turns one reinforcing member 91, one reinforcing member 91 overrides the projections 94a of the other reinforcing member 91. Thus, after one reinforcing member 91 once deflects and then overrides the projections 94a of the other reinforcing member 91, the openings 94b of one reinforcing member 91 are fitted on the projections 94a of the other reinforcing member 91.

Figure 17C:
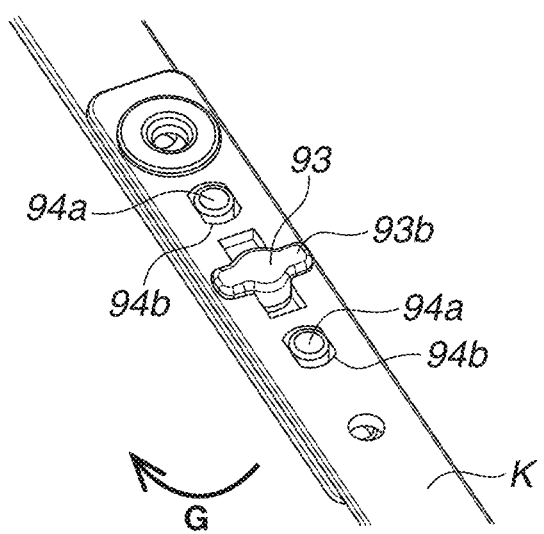

FIG. 17C is a diagram illustrating, in an enlarged manner, a coupling portion obtained when the reinforcing members 91 are coupled to each other in the above-mentioned way. The projections 94a are fitted in the openings 94b, so that the reinforcing members 91 are prevented from turning in the direction of arrow G relative to each other.

Figure 18A:
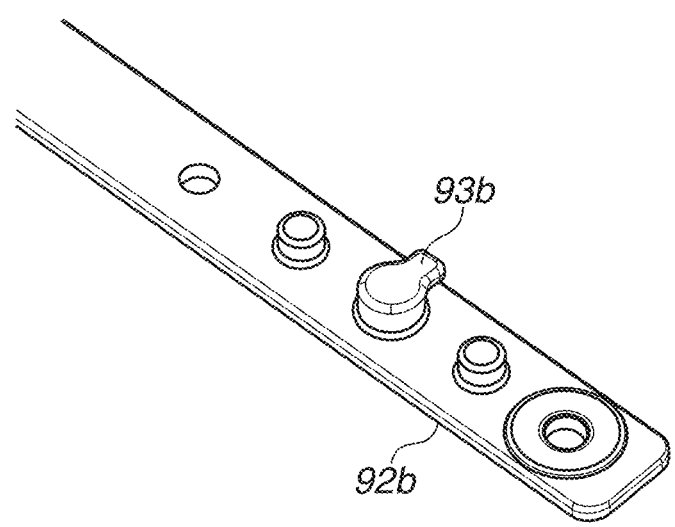
FIGS. 18A, 18B, and 18C are diagrams used to explain another configuration of the reinforcing member.
Figure 18B:
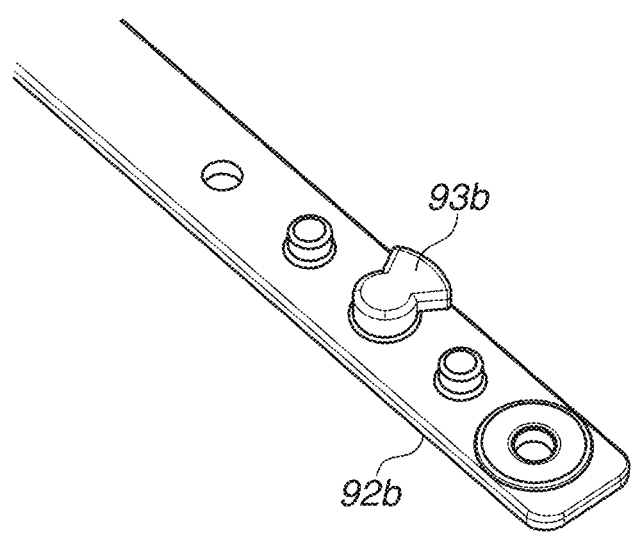
Figure 18C:
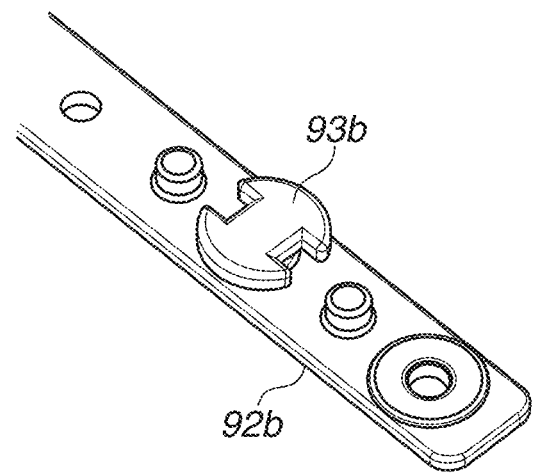

Moreover, in a state in which two reinforcing members 91 have been connected to each other, since the umbrella shape 93b of the other reinforcing member 91 is in contact with the surface K of one reinforcing member 91, these reinforcing members 91 also do not drop out of each other in the direction of arrow N. Furthermore, as the shape of the umbrella shape 93b, various configurations can be considered as illustrated in FIGS. 18A, 18B, and 18C. For example, a shape in which a part of the umbrella shape 93b described above is chipped such as that illustrated in FIG. 18A, a fan-like shape such as that illustrated in FIG. 18B, or a shape in which a groove is formed in a part of the umbrella such as that illustrated in FIG. 18C can be employed.

In any configuration, two reinforcing members 91 are connected to each other without the use of a screw or a vis screw. If connection is performed with use of, for example, a screw, the possibility that a pan head portion provided in a screw foot comes into contact with the video cable 90a or the power cable 90b to break these cables is not negligible. Therefore, in the present exemplary embodiment, a coupling method which does not use components such as a screw or a vis screw is employed.

<Length Adjustment within Single Reinforcing Member>

In the above description, changing of the length of the cable 90 is coped with by using a plurality of reinforcing members 91. However, with regard to the length of the cable 90, some users may require a length shorter than that of a single reinforcing member 91. Moreover, there is also an idea of making the length of a single reinforcing member 91 as long as possible to reduce the number of parts for cost advantage. Thus, a case where only a single reinforcing member 91 is used is sufficiently supposable, and, in such a case, a configuration capable of adjusting the length of the reinforcing member 91 is favorable.

If a plurality of types of reinforcing members 91 different in length is prepared in advance, it is necessary to produce molds for manufacturing various types of reinforcing members 91. Moreover, it is also necessary to manage the produced various reinforcing members 91 different in length. In this way, to prepare a plurality of types of reinforcing members 91 different in length, the production cost for molds or the management cost for components may be incurred. To solve such issues, a configuration capable of adjusting the length of a single reinforcing member 91 within such a reinforcing member 91 is employed.

Figure 19A:
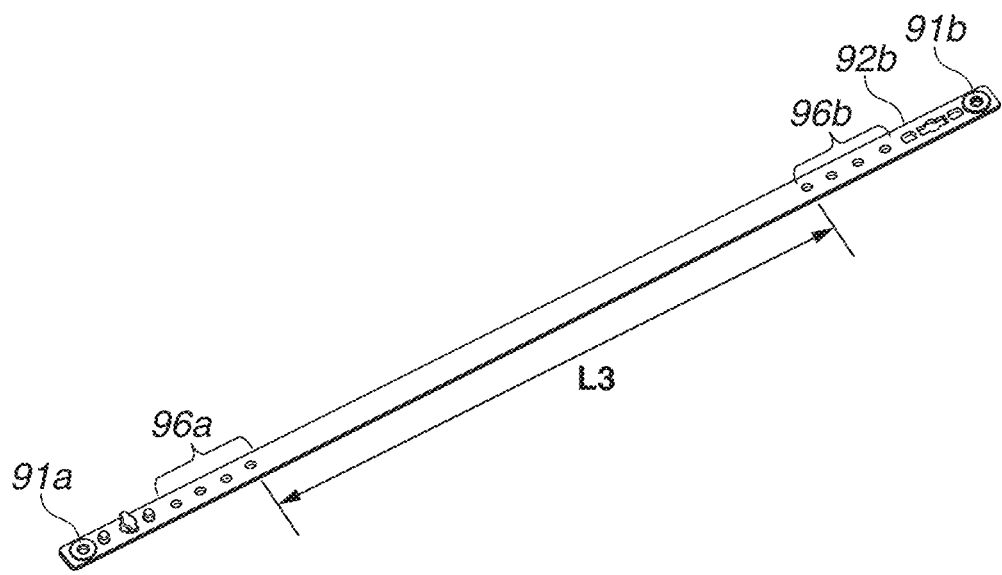
FIGS. 19A and 19B are diagrams used to explain a plurality of fixation portions provided in the reinforcing member.

As illustrated in FIG. 19A, a reinforcing member 91 in the present exemplary embodiment includes, formed therein, a plurality of opening groups 96a and 96b at one end side and the other end side of the reinforcing member 91, respectively. Selecting openings, which are to be fastened to the frames 180 and 181, out of these opening groups implements a configuration capable of adjusting the length of the cable 90.

Figure 19B:
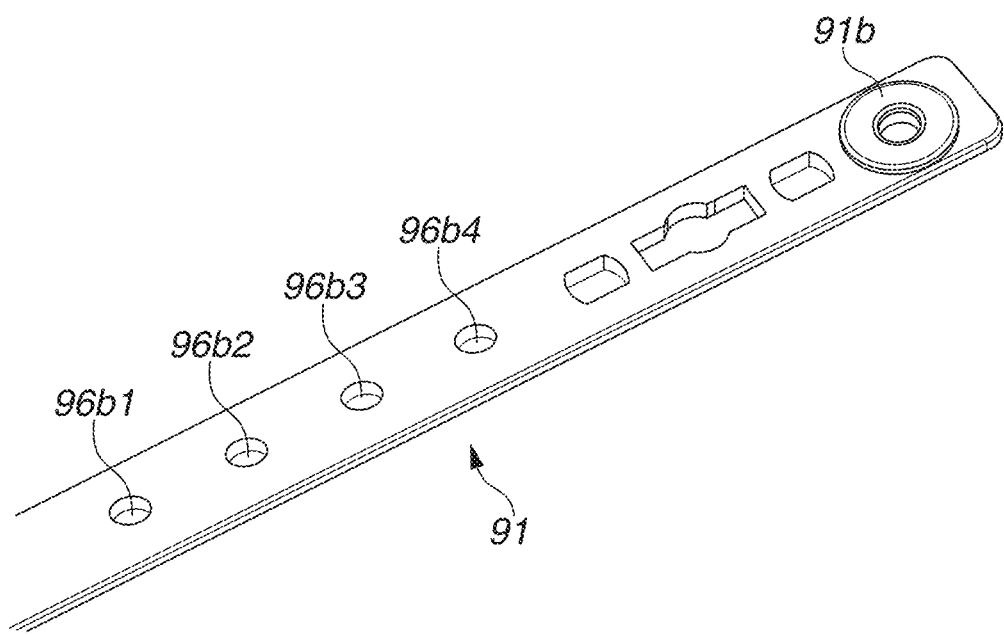

FIG. 19B is an enlarged perspective view of the other end side of the reinforcing member 91. As illustrated in FIG. 19B, at the other end side of the reinforcing member 91, an opening group 96b, which includes a plurality of openings, is formed.

At one end side of the reinforcing member 91, an opening group 96a, which includes a plurality of openings, is also formed in a similar way.

The other end side of the reinforcing member 91 is fixed to the frame 181 with a vis screw 91b. At this time, changing an opening into which to insert the vis screw 91b enables changing the amount of exposure of the reinforcing member 91 from the lead-out opening 181c of the frame 181.

As illustrated in FIG. 19B, the opening group 96b includes a first opening 96b1, a second opening 96b2, a third opening 96b3, and a fourth opening 96b4. The first opening 96b1 is an example of a first fixation portion (engagement portion). Moreover, the second opening 96b2 is an example of a second fixation portion (engagement portion). These first to fourth openings 96b1 to 96b4 are formed at intervals along the longitudinal direction of the reinforcing member 91. As illustrated in FIG. 19B, the second opening 96b2 is formed at a position closer to the forefront side of the reinforcing member 91 than the first opening 96b1.

Moreover, the opening group 96a formed at one end side of the reinforcing member 91 also includes four openings in the present exemplary embodiment. These four openings are also formed at intervals along the longitudinal direction of the reinforcing member 91. In a case where an opening closest to the middle of the reinforcing member 91 out of these four openings is considered as a first fixation portion, one of the remaining three openings formed closer to the forefront side of the reinforcing member 91 than the opening closest to the middle thereof is equivalent to a second fixation portion. Thus, how to consider a fixation point is the same between one end side and the other end side of the reinforcing member 91.

As with the other end side of the reinforcing member 91, one end side of the reinforcing member 91 is fixed to the frame 180 with a vis screw 91a. At this time, changing an opening into which to insert the vis screw 91a enables changing the amount of exposure of the reinforcing member 91 from the lead-out opening 180c of the frame 180.

In this way, adjusting the length of a region of the reinforcing member 91 exposed from each of the frame 180 and the frame 181 enables adjusting the length of the cable 90.

While, as mentioned above, a portion to be fixed to the frame 180 in portions at one end side of the reinforcing member 91 and a portion to be fixed to the frame 181 in portions at the other end side of the reinforcing member 91 are able to be adjusted, at whatever portion a fixation portion is formed, the above-mentioned relationship in which the distance L3 is shorter than each of the distance L1 and the distance L2 is satisfied.

As described above, since the image forming system 1 is configured in such a manner that the distance between a portion fixed to the frame 180 of the operation unit 80 and a portion fixed to the frame 181 of the image forming apparatus 2 in the reinforcing member 91 is longer than the distance between a portion fixed to the frame 180 of the operation unit 80 and a portion fixed to the frame 181 of the image forming apparatus 2 in an electric wire (video cable 90a, the power cable 90b, or both of them), it is possible to reduce the possibility that the electric wire is broken when the cable 90 is pulled.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:
   a first housing including an image forming unit configured to perform image formation on a sheet;
   an operation unit moveably placed on a top surface of the first housing and configured to receive an operation by a user, the operation unit including a second housing different from the first housing and a display unit configured to display an image;
   a first board provided in the first housing and including an output unit configured to output the image to be displayed by the display unit;
   a second board provided in the second housing and having a control unit configured to control display by the display unit;
   a cable connected to the first board and the second board and configured to transmit the image; and
   a reinforcing member provided along the cable and including a first fixing portion fixed to the first housing and a second fixing portion fixed to the second housing,
   wherein the reinforcing member is not fixed to the first board and the second board, and
   wherein a movable range of the operation unit on the top surface of the first housing is a range of a length of the reinforcing member.

2. The image forming apparatus according to claim 1, wherein the cable and the reinforcing member are covered by a covering.

3. The image forming apparatus according to claim 2, wherein a portion of the cable covered by the covering is deformed.

4. The image forming apparatus according to claim 1, wherein the cable is a first cable, and
   the image forming apparatus further comprises a second cable connected to the first board and the second board and configured to supply electric power to the second board.

5. The image forming apparatus according to claim 4, wherein the first cable, the second cable, and the reinforcing member are covered by a covering.

6. The image forming apparatus according to claim 1, wherein the cable includes a third fixing portion fixed to the first housing and a fourth fixing portion fixed to the second housing.

7. The image forming apparatus according to claim 6, wherein a length of the cable between the third fixing portion and the fourth fixing portion is longer than a length of the reinforcing member between the first fixing portion and the second fixing portion.

8. The image forming apparatus according to claim 1, wherein the operation unit further includes a support portion configured to support the operation unit and pivotally move in a predetermined direction, and
   wherein an angle formed by the display unit and the top surface of the first housing changes by the support portion pivotally moving in the predetermined direction.

* * * * *